(12) United States Patent
Soda et al.

(10) Patent No.: US 11,463,644 B2
(45) Date of Patent: Oct. 4, 2022

(54) IMAGING DEVICE, IMAGING SYSTEM, AND DRIVE METHOD OF IMAGING DEVICE

(71) Applicant: CANON KABUSHIKI KAISHA, Tokyo (JP)

(72) Inventors: Takehiko Soda, Kanagawa (JP); Kazutoshi Torashima, Kanagawa (JP); Hiroo Akabori, Kanagawa (JP); Hideo Kobayashi, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/272,040

(22) PCT Filed: Aug. 23, 2019

(86) PCT No.: PCT/JP2019/033026
§ 371 (c)(1),
(2) Date: Feb. 26, 2021

(87) PCT Pub. No.: WO2020/045278
PCT Pub. Date: Mar. 5, 2020

(65) Prior Publication Data
US 2022/0132068 A1    Apr. 28, 2022

(30) Foreign Application Priority Data

Aug. 31, 2018 (JP) .............................. JP2018-163852
Jun. 10, 2019 (JP) .............................. JP2019-180210

(51) Int. Cl.
*H04N 5/374* (2011.01)
*H04N 5/3745* (2011.01)
(Continued)

(52) U.S. Cl.
CPC .......... *H04N 5/3742* (2013.01); *H04N 5/347* (2013.01); *H04N 5/378* (2013.01); *H04N 5/379* (2018.08);
(Continued)

(58) Field of Classification Search
None
See application file for complete search history.

(56) References Cited

U.S. PATENT DOCUMENTS 7,990,440 B2    8/2011    Kobayashi et al. .......... 348/241
8,349,640 B2    1/2013    Soda .............................. 438/73
(Continued)

FOREIGN PATENT DOCUMENTS

EP    1102323 B1    5/2001
JP    2012085916 A    5/2012

OTHER PUBLICATIONS

U.S. Appl. No. 17/241,297, filed Apr. 27, 2021.
(Continued)

*Primary Examiner* — Mark T Monk
(74) *Attorney, Agent, or Firm* — Venable LLP

(57) ABSTRACT

An imaging device includes a pixel unit having a plurality of pixels forming a plurality of rows and a plurality of columns, and a readout unit that divides the pixel unit into a plurality of pixel blocks based on a division pattern, each pixel block including at least two pixels, and combines signals from the at least two pixels included in one pixel block to generate one signal for each of the pixel blocks. A detection unit detects a change in signal values between a plurality of signals sequentially generated by the readout unit of the one pixel block. A control unit controls the readout unit to output a signal individually from each of the pixels included in at least one pixel block in response to detecting a change in the
(Continued)

signal values, and controls the readout unit so that the division patterns are different in at least two frames.

32 Claims, 20 Drawing Sheets

(51) Int. Cl.
*H04N 5/369* (2011.01)
*H04N 9/04* (2006.01)
*H04N 5/347* (2011.01)
*H04N 5/378* (2011.01)

(52) U.S. Cl.
CPC ....... *H04N 5/37457* (2013.01); *H04N 9/0455* (2018.08)

(56) References Cited

U.S. PATENT DOCUMENTS

| | | | |
|---|---|---|---|
| 8,710,558 B2 | 4/2014 | Inoue et al. ................ 257/290 |
| 8,835,828 B2 | 9/2014 | Kobayashi ................ 250/214 R |
| 8,884,391 B2 | 11/2014 | Fudaba et al. ............... 257/432 |
| 8,976,282 B2 | 3/2015 | Soda ............................ 348/302 |
| 9,026,972 B2 | 5/2015 | Soda ............................ 716/120 |
| 9,094,624 B2 | 7/2015 | Shimotsusa et al. ........................ H01L 27/1464 |
| 9,257,472 B2 | 2/2016 | Soda ................ H01L 27/14634 |
| 9,264,641 B2 | 2/2016 | Kobayashi ........... H04N 5/3745 |
| 9,305,954 B2 | 4/2016 | Kato et al. ........ H01L 27/14621 |
| 9,357,122 B2 | 5/2016 | Kususaki et al. .... H04N 5/3696 |
| 9,407,847 B2 | 8/2016 | Maehashi et al. . H04N 5/37457 |
| 9,432,607 B2 | 8/2016 | Morita et al. ........ H04N 5/3698 |
| 9,437,635 B2 | 9/2016 | Soda ................ H01L 27/14629 |
| 9,438,828 B2 | 9/2016 | Itano et al. ........... H04N 5/3456 |
| 9,490,289 B2 | 11/2016 | Soda ................ H01L 27/1464 |
| 9,509,931 B2 | 11/2016 | Kobayashi et al. ... H04N 5/369 |
| 9,602,752 B2 | 3/2017 | Kobayashi et al. ......................... H01L 27/14603 |
| 9,681,078 B2 | 6/2017 | Tsuchiya et al. ... H01L 27/1463 |
| 9,716,823 B2 | 7/2017 | Iwata et al. ........ H04N 5/36961 |
| 9,768,213 B2 | 9/2017 | Soda et al. .......... H01L 27/1463 |
| 9,831,278 B2 | 11/2017 | Kato et al. ........ H01L 27/14609 |
| 9,881,950 B2 | 1/2018 | Soda ................ H01L 27/14623 |
| 10,015,430 B2 | 7/2018 | Kobayashi et al. ......................... H01L 27/14609 |
| 10,347,679 B2 | 7/2019 | Kato et al. ............. H04N 5/378 |
| 10,609,316 B2 | 3/2020 | Kobayashi ......... H04N 5/23245 |
| 2008/0244228 A1 | 10/2008 | Overdick |
| 2009/0192348 A1 | 7/2009 | Nishino |
| 2010/0053356 A1 | 3/2010 | Tsunekawa |
| 2011/0013033 A1 | 1/2011 | Mori |
| 2011/0317053 A1 | 12/2011 | Hiramoto |
| 2012/0175503 A1 | 7/2012 | Kuroda et al. ............ 250/214 A |
| 2013/0140440 A1 | 6/2013 | Kobayashi ................ 250/208.2 |
| 2014/0217302 A1 | 8/2014 | Arques |
| 2015/0189214 A1 | 7/2015 | Kurose |
| 2015/0350575 A1 | 12/2015 | Agranov |
| 2016/0227141 A1 | 8/2016 | Kobayashi et al. ... H04N 5/341 |
| 2016/0286108 A1 | 9/2016 | Fettig |
| 2016/0381311 A1 | 12/2016 | Guo |
| 2017/0302866 A1 | 10/2017 | Fu |
| 2018/0083053 A1 | 3/2018 | Soda .................. H04N 5/36961 |
| 2019/0379852 A1 | 12/2019 | Akabori ................ H04N 5/341 |
| 2020/0343287 A1 | 10/2020 | Nakata et al. .... H01L 27/14645 |
| 2020/0378828 A1 | 12/2020 | Kobayashi et al. ......................... H01L 27/14634 |
| 2020/0412990 A1 | 12/2020 | Akabori ................ H04N 5/374 |
| 2021/0021770 A1 | 1/2021 | Nakazawa et al. ......................... G06T 2207/30252 |
| 2021/0021777 A1 | 1/2021 | Kobayashi et al. ... H04N 5/379 |
| 2021/0021782 A1 | 1/2021 | Sato et al. ........ B60R 2300/301 |

OTHER PUBLICATIONS

PCT International Search Report PCT/JP2019/033026 dated Mar. 2, 2021.

PCT International Search Report PCT/JP2019/033026 dated Oct. 22, 2019.

IMAGING DEVICE, IMAGING SYSTEM, AND DRIVE METHOD OF IMAGING DEVICE

This application is a National Stage application of PCT Application No. PCT/JP2019/033026 filed on Aug. 23, 2019, which claims benefit of earlier Japanese Patent Application No. 2018-163852 filed Aug. 31, 2018, and Japanese Patent Application No. 2019-108210 filed Jun. 10, 2019.

TECHNICAL FIELD

The present invention relates to an imaging device, an imaging system, and a drive method of the imaging device.

BACKGROUND ART

Conventionally, imaging devices having a function of detecting motion of a subject have been proposed. The imaging device disclosed in Non Patent Literature 1 intends to reduce current consumption in a motion detection period by dividing a pixel array into a plurality of pixel blocks and adding and reading out signals within the pixel block.

CITATION LIST

Non Patent Literature

NPL 1: O. Kumagai, et al. "A ¼-inch 3.9 Mpixel Low-Power Event-Driven Back-Illuminated Stacked CMOS Image Sensor" ISSCC Dig. Tech. Papers, pp. 86-87, Feb. 2018.

SUMMARY OF INVENTION

In Non Patent Literature 1, however, there is no consideration for the number, the arrangement, or the like of pixels forming pixel blocks during a motion detection period, and there is a problem of reduction in accuracy of motion detection for particular subjects. Alternatively, in the operation flow disclosed in Non Patent Literature 1, a moving object may not be detected when a dark subject moves, when a small subject moves, or the like. In such a case, an opportunity of capturing a subject at a high resolution may be lost.

An imaging device according to one disclosure of the present specification includes: a pixel unit having a plurality of pixels arranged to form a plurality of rows and a plurality of columns; a readout unit that divides the pixel unit into a plurality of pixel blocks in accordance with a division pattern, each pixel block including at least two of the plurality of pixels, and combines signals from the at least two of the plurality of pixels included in one pixel block of the plurality of pixel blocks to generate one signal for each of the plurality of pixel blocks; a detection unit that detects a change in signal values between a plurality of signals that are sequentially generated by the readout unit of the one pixel block; and a control unit that, in response to the detection unit detecting a change in the signal values, controls the readout unit so as to output a signal individually from each of the plurality of pixels included in at least the one pixel block, and the control unit controls the readout unit so that the division patterns are different between at least two frames.

An imaging device according to another disclosure of the present specification includes: a pixel unit having a plurality of pixels arranged to form a plurality of rows and a plurality of columns; a readout unit that divides the pixel unit into a plurality of pixel blocks in accordance with a division pattern, each pixel block including at least two of the plurality of pixels, and combines signals from the at least two of the plurality of pixels included in one pixel block of the plurality of pixel blocks to generate one signal for each of the plurality of pixel blocks; a detection unit that detects a change in signal values between a plurality of signals that are sequentially generated by the readout unit of the one pixel block; and a control unit that, in response to the detection unit detecting a change in the signal values, controls the readout unit so as to output a signal individually from each of the plurality of pixels included in at least the one pixel block, and the control unit controls the readout unit so that, in a frame in which the division pattern includes a first pixel block and a second pixel block, the number of pixels forming the first pixel block and the number of pixels forming the second pixel block are different from each other An imaging device according to another disclosure of the present specification includes: a pixel unit having a plurality of pixels arranged to form a plurality of rows and a plurality of columns; a readout unit that divides the pixel unit into a plurality of pixel blocks in accordance with a division pattern, each pixel block including at least two of a plurality of pixels, and combines signals from the at least two of the plurality of pixels included in one pixel block of the plurality of pixel blocks to generate one signal for each of the plurality of pixel blocks; a detection unit that detects a change in signal values between a plurality of signals that are sequentially generated by the readout unit of the one pixel block; and a control unit that, in response to the detection unit detecting a change in the signal values, controls the readout unit so as to output a signal individually from each of the plurality of pixels included in at least the one pixel block, and when the detection unit detects no change in the signal values for a predetermined number of frames, the control unit controls the readout unit so as to output signals individually from the plurality of pixels included in at least the one pixel block.

According to the present invention, it is possible to capture a subject suitably while suppressing current consumption. For example, it is possible to improve accuracy in motion detection of a subject. Alternatively, it is possible to capture a subject independently of motion detection.

DESCRIPTION OF EMBODIMENTS

The embodiments of the present invention will be described below. An imaging device in the embodiments described later includes a pixel unit, a readout unit, a detection unit, and a control unit. The pixel unit has a plurality of pixels arranged over a plurality of rows and a plurality of columns. The readout unit divides the pixel unit into a plurality of pixel blocks each including the plurality of pixels in accordance with a predetermined division pattern and combines signals from the plurality of pixels included in a pixel block to generate one signal in each of the pixel blocks. The detection unit detects a change in signal values of a plurality of signals that are output sequentially from one pixel block. In response to the detection unit detecting a change in the signal values, the control unit controls the readout unit so as to output a signal individually from each of the plurality of pixels included in at least one pixel block. The control unit controls the readout unit so that the division pattern is different between at least two frames.

Specifically, each of the plurality of pixel blocks in a division pattern may include a predetermined number of pixels. The control unit changes the number of pixels included in the pixel block based on motion of a subject detected in an imaging signal of a plurality of frames. Further, the plurality of pixel blocks in a division pattern may include a first pixel block including a predetermined number of pixels and a second pixel block including the number of pixels that is more than the predetermined number of pixels. In such a case, the control unit can change the number or the arrangement of each of the first pixel block and the second pixel block on a frame basis.

By changing a division pattern such as the number of pixels or the arrangement of pixel block on a frame basis, it is possible to improve motion detection accuracy while suppressing current consumption during a period of detecting motion of a subject.

The embodiments of the present invention will be described below by using the drawings. The present invention is not limited to the embodiments described below. For example, a feature of a part of any of the embodiments described below may be added to another embodiment or replaced with a feature of a part of another embodiment.

First Embodiment

Figure 1:
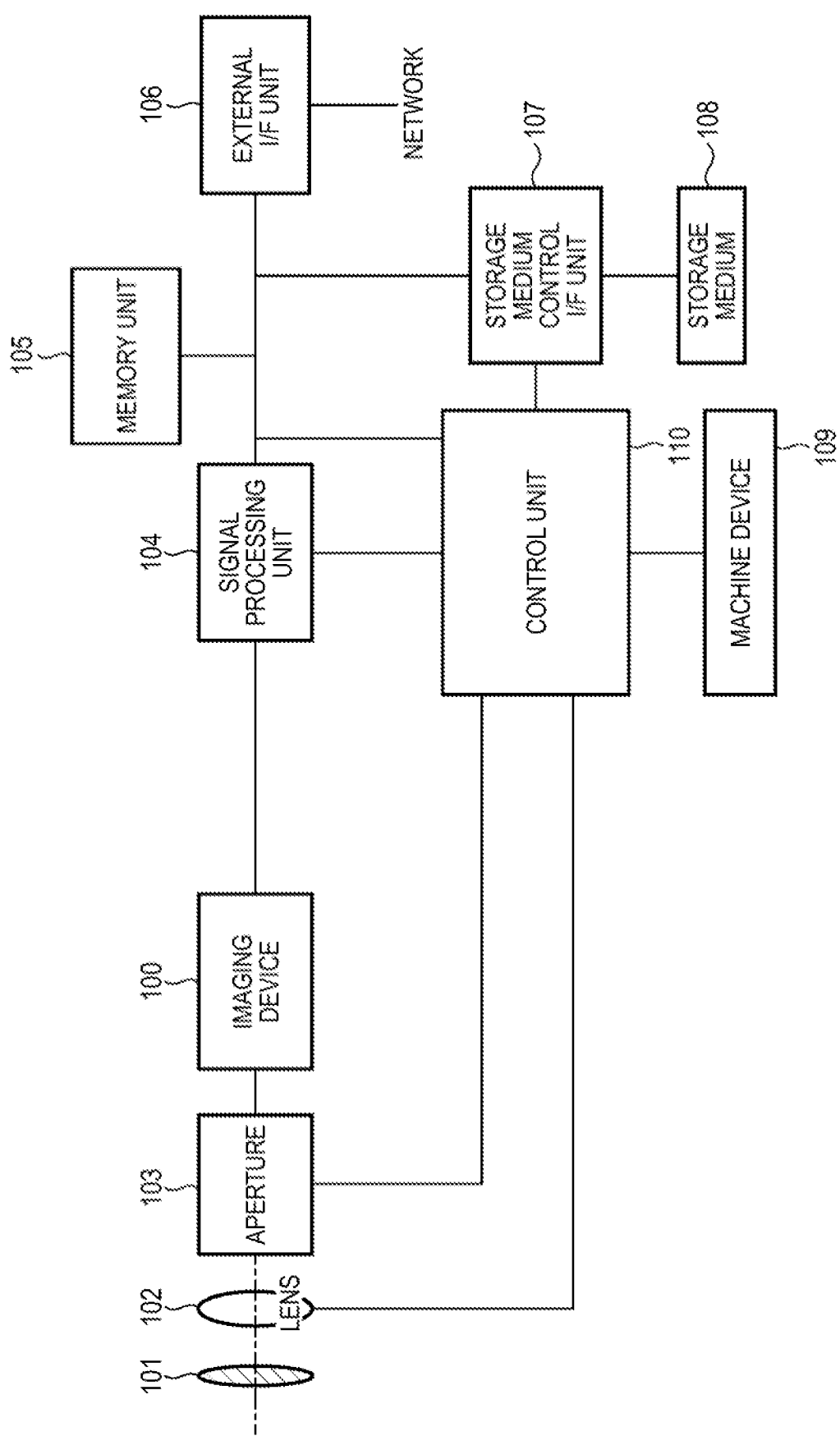
FIG. 1 is a block diagram of an imaging system in a first embodiment of the present invention.

FIG. 1 is a block diagram of an imaging system in the present embodiment. The imaging system may be a digital still camera, a digital camcorder, a camera head, a surveillance camera, a copy machine, a fax machine, a mobile terminal, a smartphone, an on-vehicle camera, an observation satellite, an artificial intelligence robot, or the like.

The imaging system illustrated in FIG. 1 has a barrier 101, a lens 102, an aperture 103, an imaging device 100, a signal processing unit 104, a memory unit 105, an external I/F unit 106, a storage medium control I/F unit 107, a storage medium 108, a machine device 109, and a control unit 110. The barrier 101 protects the lens 102, and the lens 102 forms an optical image of a subject on the imaging device 100. The aperture 103 can change the amount of a light that has passed through the lens 102. The imaging device 100 is a Complementary Metal Oxide Semiconductor (CMOS) type solid state imaging device and converts an optical image formed by the lens 102 into image data. The imaging device 100 may include a semiconductor substrate on which a pixel circuit, a signal processing circuit, and the like are formed, a package storing a semiconductor substrate, and a connection terminal to an external circuit, or the like. An analog-to-digital (AD) converter unit is formed on the semiconductor substrate of the imaging device 100. The signal processing unit 104 performs image processing such as gradation correction, noise removal, or the like on image data output by the imaging device 100.

The memory unit 105 has a volatile memory such as a dynamic memory or a non-volatile memory such as a flash memory and functions as a frame memory that stores image data. The external I/F unit 106 is a wired or wireless interface that communicates with an external computer, a network, a server, or the like. The storage medium control I/F unit 107 is an interface that performs storage or readout of image data on the storage medium 108, and the storage medium 108 is a removable storage medium such as a memory card having a semiconductor memory that stores image data. The machine device 109 may include a drive device of an optical mechanism such as the lens 102 and the aperture 103, a mechanism device that performs attitude control or the like of a camera head, or the like. The control unit 110 has a CPU, a ROM, a RAM, or the like, and performs control of the whole imaging system in accordance with a predetermined program. Further, the control unit 110 can detect motion of a subject in image data and perform predetermined processing thereon. In FIG. 1, the signal processing unit 104, the memory 105, and the control unit 110 are provided separately from the imaging device 100 but may be formed on the same semiconductor substrate as the imaging device 100.

Figure 2:
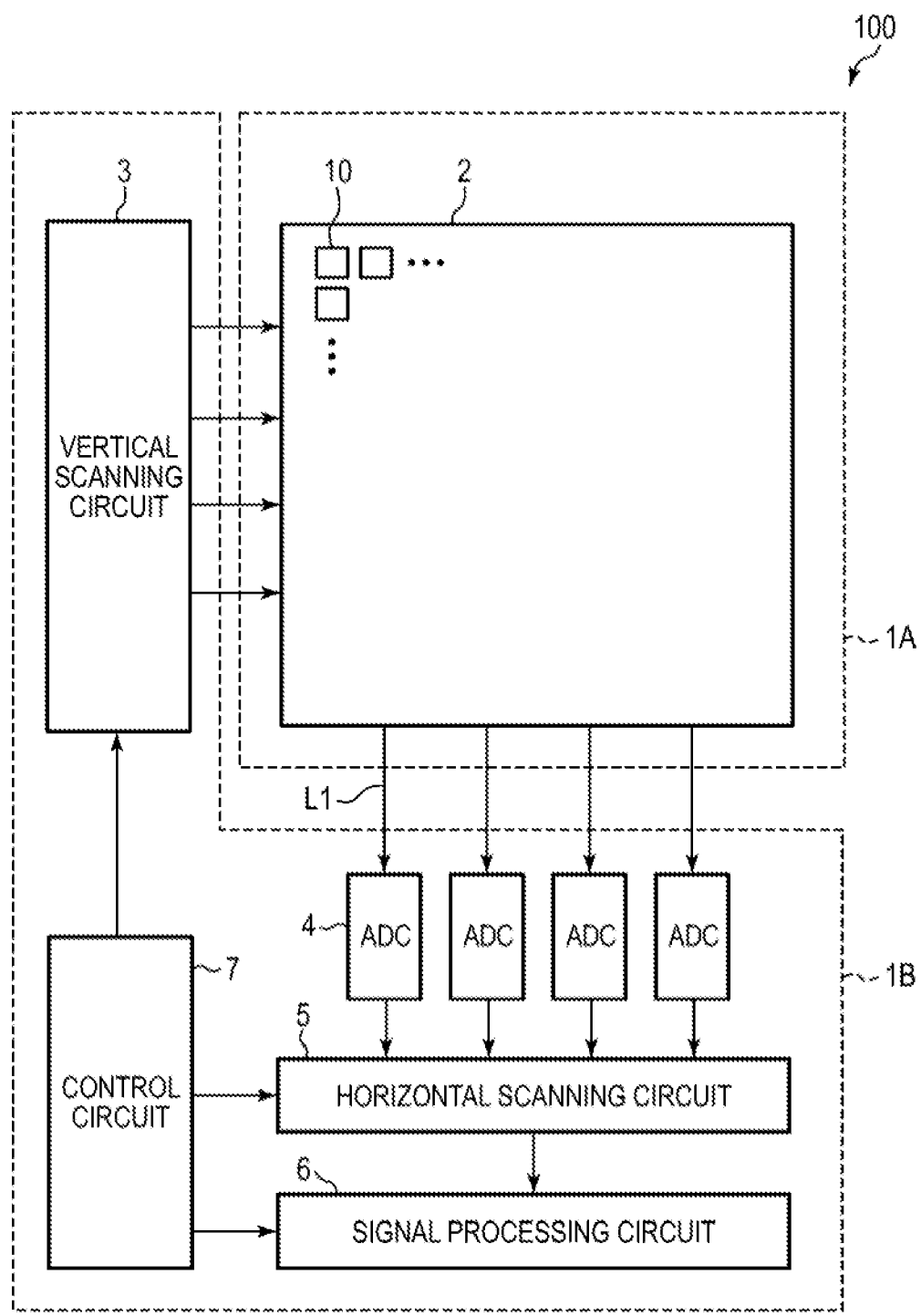
FIG. 2 is a block diagram of an imaging device in the first embodiment of the present invention.

FIG. 2 is a block diagram of the imaging device in the present embodiment. In the present embodiment, circuit elements of the imaging device 100 are formed on two stacked semiconductor substrates 1A and 1B. A pixel unit 2 is formed on the semiconductor substrate (first substrate)

1A, and a readout unit such as a vertical scanning circuit 3, analog-to-digital converter circuits (ADC circuit) 4, a horizontal scanning circuit 5, a signal processing circuit 6, and a control circuit 7 is formed on the semiconductor substrate (second substrate) 1B. Respective wiring layers of the semiconductor substrates 1A and 1B are electrically connected to each other by metallic bond such as Cu—Cu, for example.

The pixel unit 2 has a plurality of pixels 10 arranged over a plurality of rows and a plurality of columns, and each pixel 10 has a photoelectric conversion unit that generates and accumulates charges based on irradiation light. Note that, in the present specification, the row direction indicates the horizontal direction in the drawings, and the column direction indicates the vertical direction in the drawings. Micro-lenses and color filters may be arranged on the pixels 10. The color filters are, for example, primary color filters of red, blue and green, and are provided on respective pixels 10 in accordance with the Bayer arrangement. Some of the pixels 10 are light-shielded as optical black pixels (OB pixels). The column signal line L1 is provided for each column of the pixels 10, and a signal based on an incident light is output from the pixels 10 to the column signal line L1.

The vertical scanning circuit 3 is formed of shift registers, gate circuits, buffer circuits, or the like, and outputs drive pulses based on a vertical synchronization signal, a horizontal synchronization signal, a clock signal, or the like on a row basis. The drive pulses are provided to the pixels 10 on each row. The drive pulses may be provided on a row basis, sequentially, or at random.

The ADC circuit 4 is provided on each column of the pixels 10, reads out signals from the pixels 10, and performs analog-to-digital conversion on the signals. The ADC circuit 4 has a comparator, a pulse generation circuit, and a digital memory. The comparator is formed of a differential amplifier circuit and output a high level signal or a low level signal in accordance with a result of comparison between an analog signal on the column signal line L1 and a ramp signal that changes with time. The pulse generation circuit outputs a one-shot pulse when the output of the comparator is inverted, and the digital memory holds a count value of a counter in response to detection of the shot pulse. The time period from the time when the potential of the ramp signal starts decreasing to the time when the output of the comparator is inverted changes in accordance with the potential of signals input to the comparator. The count value held in the digital memory indicates the amplitude of the potential of a signal.

The horizontal scanning circuit 5 is formed of shift registers, gate circuits, or the like and sequentially scans a plurality of ADC circuits 4. That is, the horizontal scanning circuit 5 sequentially reads out digital image data from the digital memory of the ADC circuits 4. The signal processing circuit 6 performs various signal processing such as correlated double sampling, gradation correction, noise reduction, white balance, or the like on the digital image data. The image data from the signal processing circuits 6 is output to the outside of the imaging device 100.

The control circuit 7 functions as a timing generator that generates various control signals and drive signals based on a clock, a synchronous signal, or the like. The control circuit 7 controls the vertical scanning circuit 3, the ADC circuits 4, the horizontal scanning circuit 5, and the signal processing circuit 6. Further, as described below, the control circuit 7 can divide the pixel unit 2 into a plurality of pixel blocks and perform control to read out signals on a pixel block basis.

Figure 3:
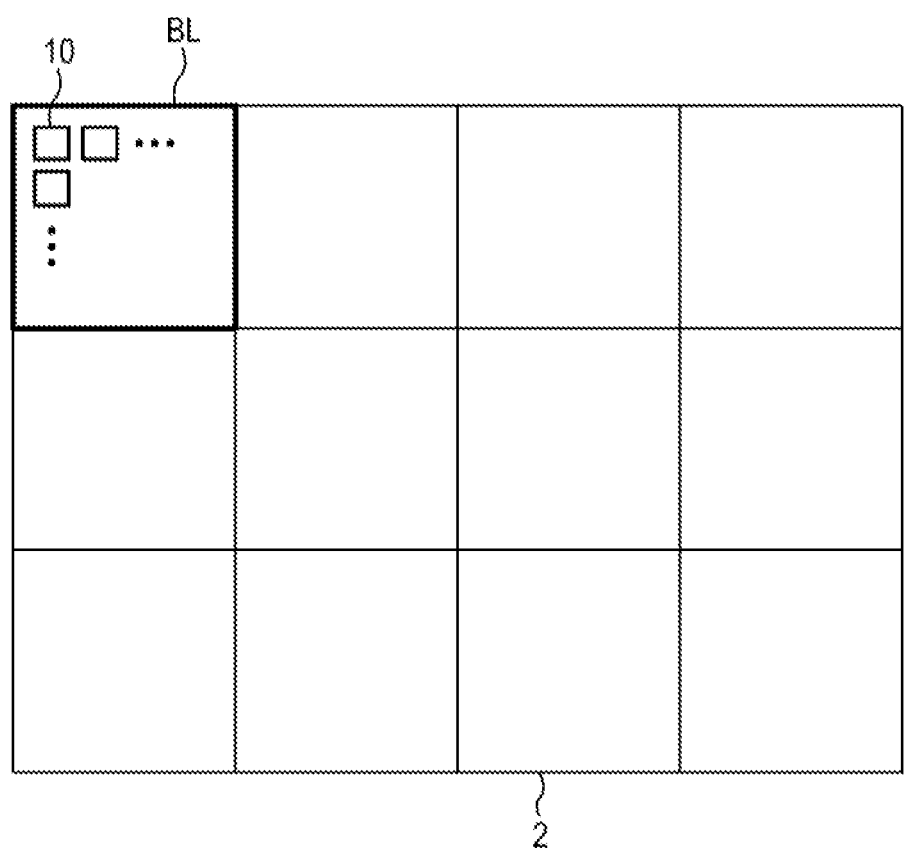
FIG. 3 is a conceptual diagram of a pixel block in the first embodiment of the present invention.

FIG. 3 is a conceptual diagram of a pixel block in the present embodiment. The pixel unit 2 is divided into a plurality of pixel blocks BL and each of the pixel blocks BL has a plurality of pixels 10 formed of m rows and n columns. The imaging device 100 in the present embodiment can read out signals on a pixel block BL basis and change the number of pixel blocks BL on a frame basis. Further, it is also possible to change the number of pixels 10 forming a pixel block BL and the shape and the size of the pixel block BL.

Figure 4:
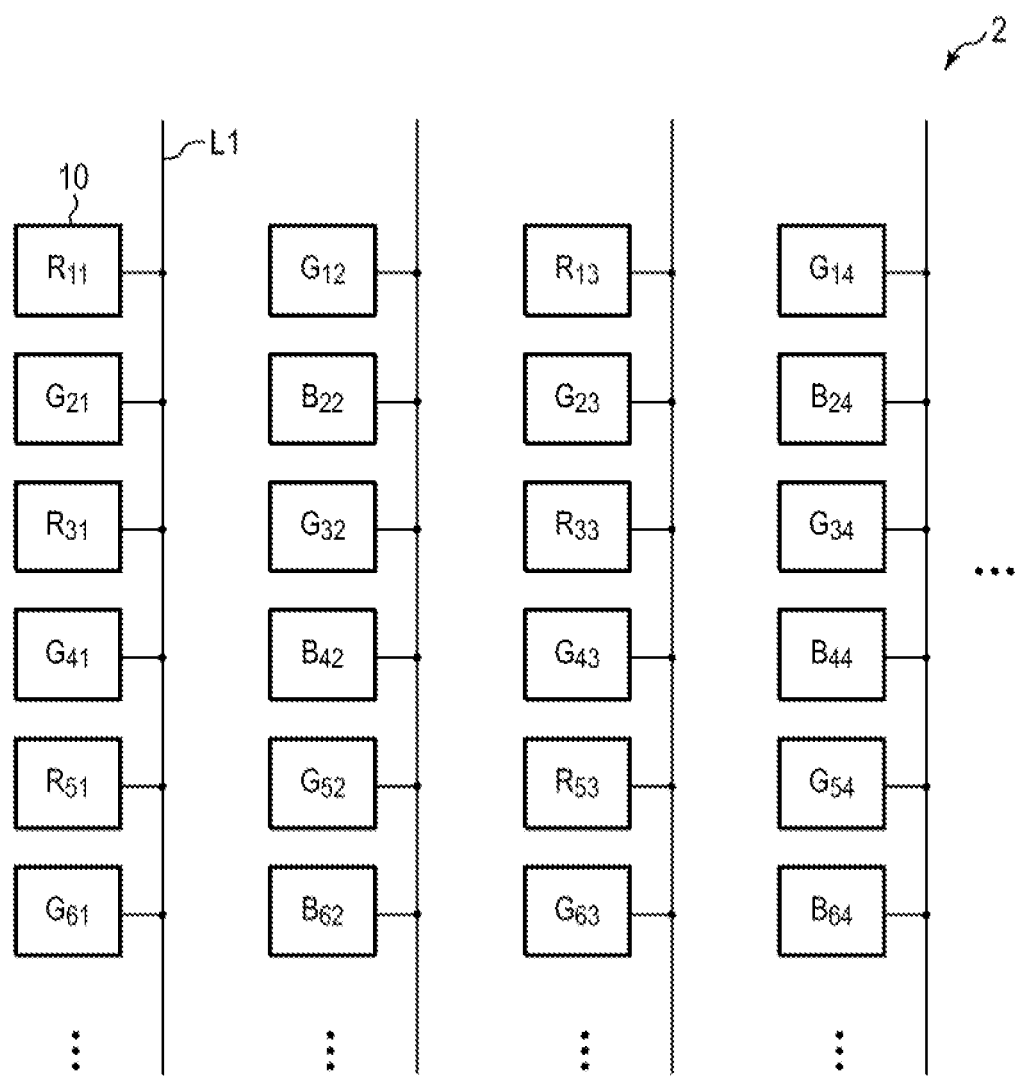
FIG. 4 is a diagram illustrating arrangement of pixels in the first embodiment of the present invention.

FIG. 4 is a diagram illustrating arrangement of pixels in the present embodiment. The color filters of red (R), blue (B), and green (G) are formed on the pixels 10 in accordance with the Bayer arrangement. For example, the red color filter R11 is arranged on the pixels 10 at the first row, the first column, and the blue color filter B22 is arranged on the pixels 10 at the second row, the second column. Further, the color filter G12 is arranged on the pixels 10 at the first row, the second column, and the green color filter G21 is arranged on pixels 10 at the second row, the first column. Note that the color filters are not necessarily required to be formed in accordance with the Bayer arrangement and may be formed using color filters of complementary colors such as magenta, cyan, yellow, and green.

Figure 5:
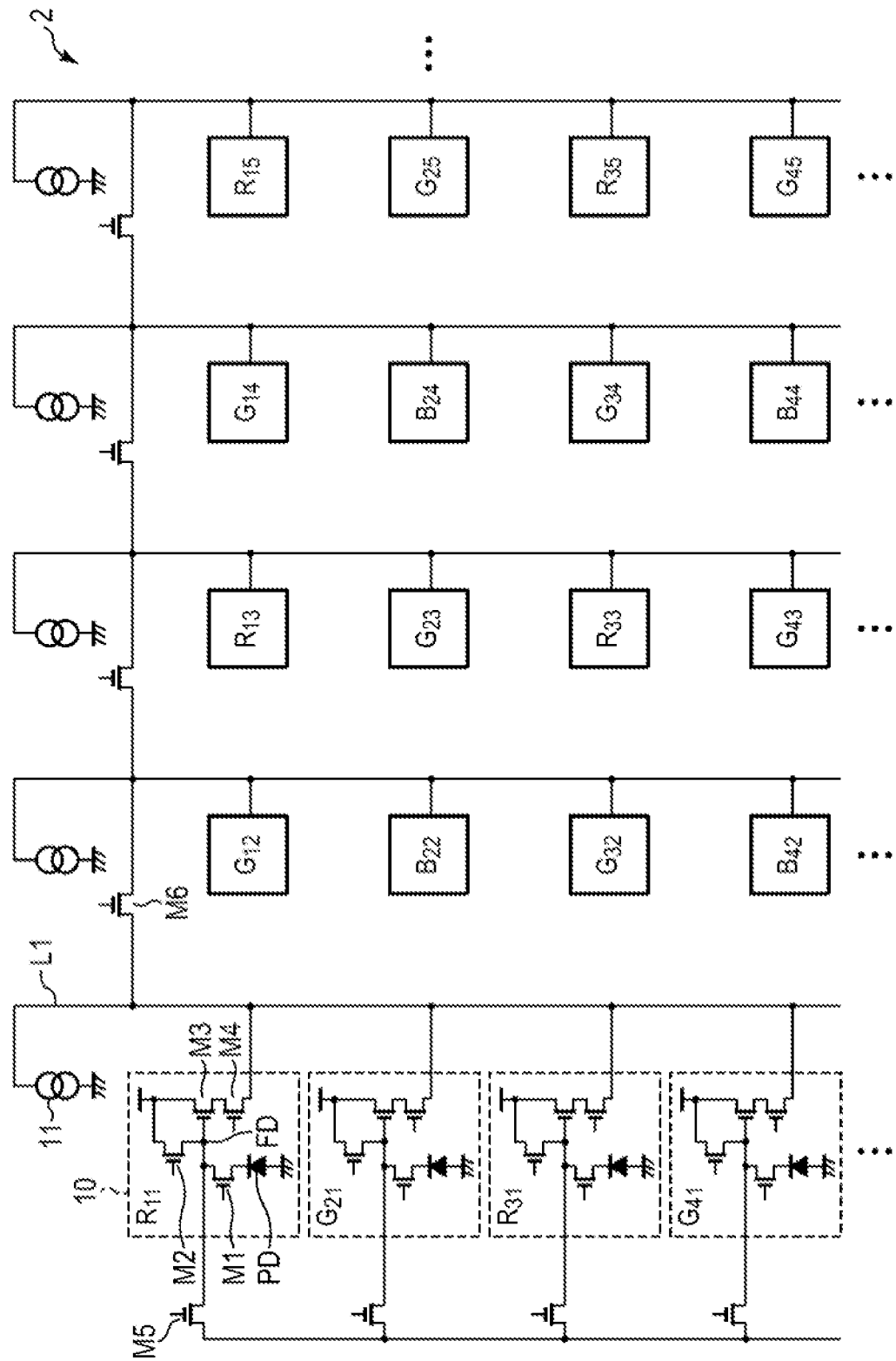
FIG. 5 is a block diagram of a pixel unit in the first embodiment of the present invention.

FIG. 5 is a block diagram of the pixel unit in the present embodiment. The pixel unit 2 has the plurality of pixels 10 arranged in a matrix, column signal lines L1, switches M5 and M6, and a constant current source 11. Each of the pixels 10 includes a photoelectric conversion unit PD, a transfer transistor M1, a reset transistor M2, an amplification transistor M3, a select transistor M4, and a floating diffusion region FD. The following description illustrates an example in which the transistor forming the pixel 10 is an N-channel MOS transistor. The photoelectric conversion unit PD is formed of a photodiode, for example, and performs photoelectric conversion with an incident light and accumulation of charges. Note that the photoelectric conversion unit PD is not limited to a photodiode and may be a material that generates photoelectric effect. The photoelectric conversion unit PD is provided with a micro-lens, and a light collected by the micro-lens enters the photoelectric conversion unit PD.

A drive pulse is input from the vertical scanning circuit 3 to the gate of the transfer transistor M1. When the drive pulse transitions to a high level, the transfer transistor M1 is turned on (conductive state), and charges of the photoelectric conversion unit PD are transferred to the floating diffusion region FD that is the input node of the amplification transistor M3. Further, when the drive pulse transitions to a low level, the transfer transistor M1 is turned off (nonconductive state). By turning on or off the transfer transistor M1, charges of the photoelectric conversion unit PD can be transferred to the floating diffusion region FD. The amplification transistor M3 outputs a signal based on charges transferred to the floating diffusion region FD to the column signal line L1 via the select transistor M4.

The source of the reset transistor M2 is connected to the floating diffusion region FD, and the drive pulse is input from the vertical scanning circuit 3 to the gate. When the drive pulse transitions to the high level, the reset transistor M2 is turned on, and a reset voltage is provided to the floating diffusion region FD. The select transistor M4 is provided between the amplification transistor M3 and the column signal line L1, a drive pulse is input from the vertical scanning circuit 3 to the gate of the select transistor M4. When the drive pulse transitions to the high level, the amplification transistor M3 and the column signal line L1 are electrically connected to each other.

The general operation of the pixels 10 formed as described above will be described. The vertical scanning circuit 3 resets charges of the floating diffusion region FD by turning on the select transistor M4 and turning on the reset transistor M2. The vertical scanning circuit 3 turns off the reset transistor M2 and ends the reset operation. A signal in a reset state of the pixels 10 is output to the column signal lines L1 and input to the ADC circuit 4. After the reset transistor M2 of the pixel 10 is turned off, the voltage of the floating diffusion region FD includes reset noise. The vertical scanning circuit 3 turns on the transfer transistor M1 and transfers charges accumulated in the photoelectric conversion unit PD to the floating diffusion region FD. The potential of the floating diffusion region FD changes by a predetermined potential in accordance with the amount of charges. From the amplification transistor M3, a signal based on charges of the photoelectric conversion unit PD is output to the column signal line L1 and input to the ADC circuit 4. By calculating the difference between a signal in the reset state described above and a signal based on charges of photoelectric conversion, so-called correlated double sampling is performed, and image data from which noise has been removed is obtained.

In the present embodiment, the pixel unit 2 further has the switches M5 and M6. The plurality of switches (first switches) M5 cause the floating diffusion regions FD of the pixels 10 on a plurality of rows on the same column to be connected to or disconnected from each other. The source of one of the switches M5 is connected to the floating diffusion region FD, and the drain is connected to the drains of the other switches M5. Drive pulses are input to the gates of the switches M5 from the vertical scanning circuit 3, and when the drive pulse transitions to the high level, the plurality of floating diffusion regions FD are electrically connected by the switches M5. For example, when the switches M5 of the first row and the second row are turned on, charges of the floating diffusion regions FD of the two pixels 10 having the color filters R11 and G21 are added and a signal based on the added charges is output to the column signal line L1. Further, when the switches M5 on the first row to the fourth row are turned on, charges of the floating diffusion regions FD on the four pixels 10 having the color filters R11, G21, R31, and G41 are added. In this way, by turning on the switches M5 on a desired row, the number of pixels 10 to be binned in the column direction (vertical direction) can be arbitrarily changed.

The plurality of switches (second switches) M6 are provided between the neighboring column signal lines L1 and cause the column signal lines L1 to be connected to or disconnected from each other. For example, the sources of the switches M6 are connected to the column signal line L1 on the first column, and the drains are connected to the column signal line L1 on the second column. When a drive pulse is input to the gates of the switches M6 from the vertical scanning circuit 3 and the drive pulse transitions to the high level, the switches M6 cause the column signal lines L1 on the first column and the second column to be electrically connected to each other. By turning on the switches M6 on a desired column, the number of pixels 10 to be binned in the row direction (horizontal direction) can be arbitrarily changed.

In the present embodiment, by appropriately turning on or off the plurality of switches M5 and M6, the pixel unit 2 can be divided, and the respective numbers of pixels 10 in the row direction and the column direction of the pixel blocks BL can be arbitrarily changed. For example, it is assumed that the pixel unit 2 is divided into a plurality of pixel blocks BL on m rows and n columns. In this case, by turning on (m−1) switches M5 and turning on (n−1) switches M6, binning to read out one signal can be performed on each pixel block BL formed of the pixels 10 on m rows and n columns. A common signal is output to a plurality of column signal lines L1 connected to one pixel block BL. It is thus sufficient to read out a signal on an n-column basis and also read and scan on an m-row basis. Therefore, the current consumption of the imaging device 100 can be reduced by increasing the size of the pixel blocks BL and increasing the number of pixels to be binned. On the other hand, in order to improve motion detection accuracy between frames, it is preferable to reduce the number of pixels in the pixel blocks BL and perform high resolution readout. In the present embodiment, as described below, it is possible to reduce the current consumption while improving motion detection accuracy by dynamically changing the division pattern such as the number of pixels and the arrangement of the pixel blocks BL.

Note that, in FIG. 5, although an example in which the pixels 10 having a plurality of different color filters (R11, G12, G21, B22, or the like) are binned is illustrated, the pixels 10 having color filters of the same color (G12, G21, or the like) may be binned.

Figure 6:
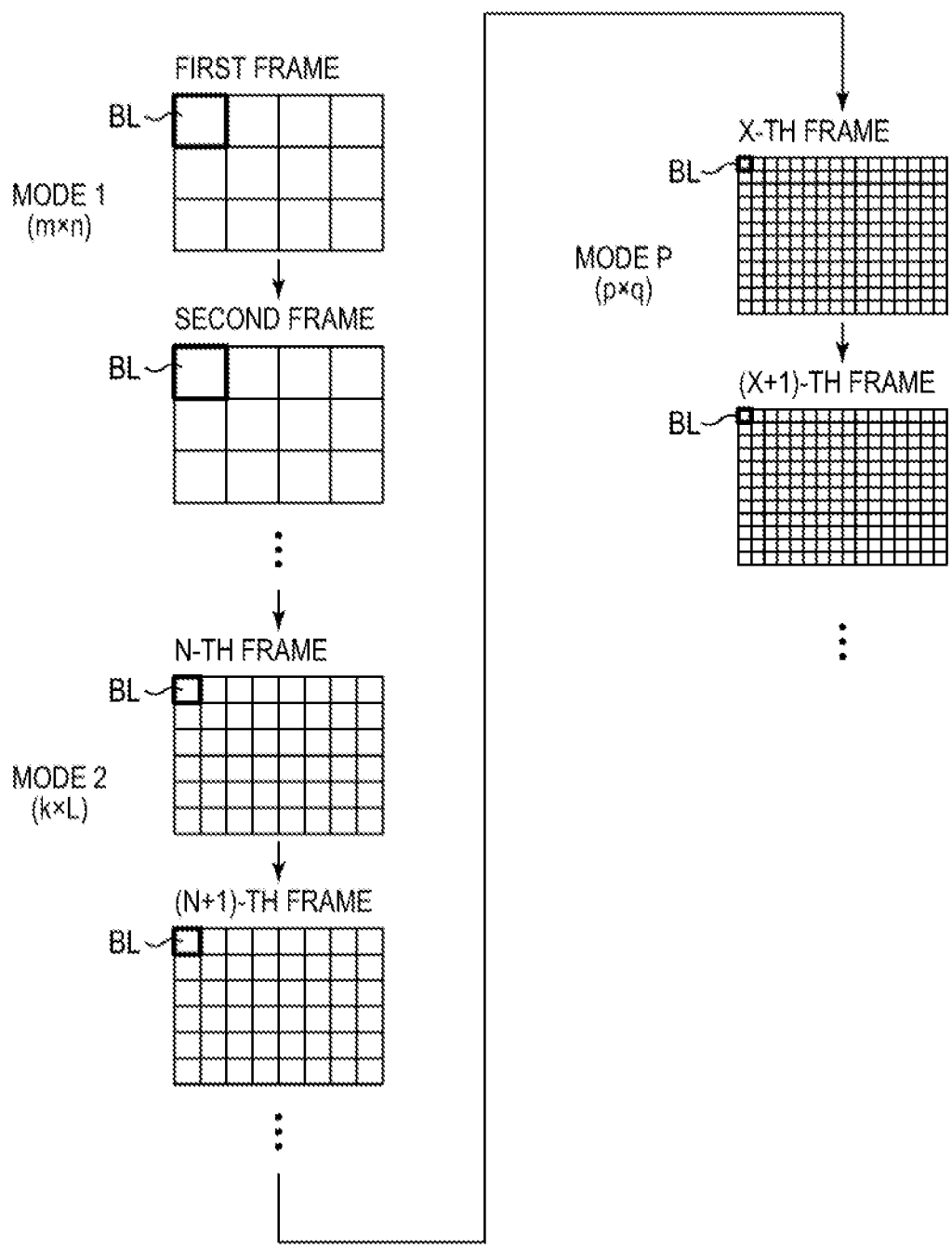
FIG. 6 is a diagram illustrating a readout method of the pixel unit in the first embodiment of the present invention.

FIG. 6 is a diagram illustrating a readout method of the pixel unit in the present embodiment, which illustrates pixel blocks and the number of pixels included in the pixel blocks for each frame. The pixel unit 2 is divided into predetermined division patterns including a plurality of pixel blocks BL, and each pixel block BL includes a predetermined number of pixels. In FIG. 6, frames are read out in the order of first, second, ..., N-th, (N+1)-th, ..., X-th, (X+1)-th. In the first and second frames, the pixel blocks BL are formed of m rows and n columns, that is, m×n pixels 10. In the N-th and (N+1)-th frames, the pixel blocks BL are formed of k rows and L columns, that is, k×L pixels 10. Furthermore, in the X-th and (X+1)-th frames, the pixel blocks BL are formed of p rows and q columns, that is, p×q pixels 10. In the present embodiment, it is desirable that the number of pixels forming the pixel blocks BL be reduced in accordance with the readout time of frames. Alternatively, it is desirable that the expression m×n>k×L>p×q be satisfied. Alternatively, at least one expression of m>k>p and n>L>q may be satisfied.

In the first and second frames, the number of divided pixel blocks BL is the smallest, and the number of pixels binned in one pixel block BL is the largest. Since it is sufficient to read out signals on an m-row basis or on an n-column basis, the current consumption in the imaging device 100 can be minimized. In the N-th and (N+1)-th frames, the number of pixel blocks BL is larger than that in the first and second frames, and the motion detection accuracy can be improved. In the X-th and (X+1)-th frames, the number of pixel blocks BL is greater than that in the N-th and (N+1)-th frames, and the motion detection accuracy can be improved.

In the present embodiment, as with the N-th frame and the (N+1)-th frame, a plurality of frames having the same number of pixel blocks BL are continuous. When prioritizing motion detection accuracy, it is desirable to increase the number of frames having a larger number of pixel blocks BL. Further, when prioritizing reduction of power consumption, the number of frames having a smaller number of pixel blocks BL may be increased. Note that, although three types of division patterns of the pixel blocks BL are illustrated in FIG. 6, two types of division patterns or four or more types of division patterns may be used.

Figure 7:
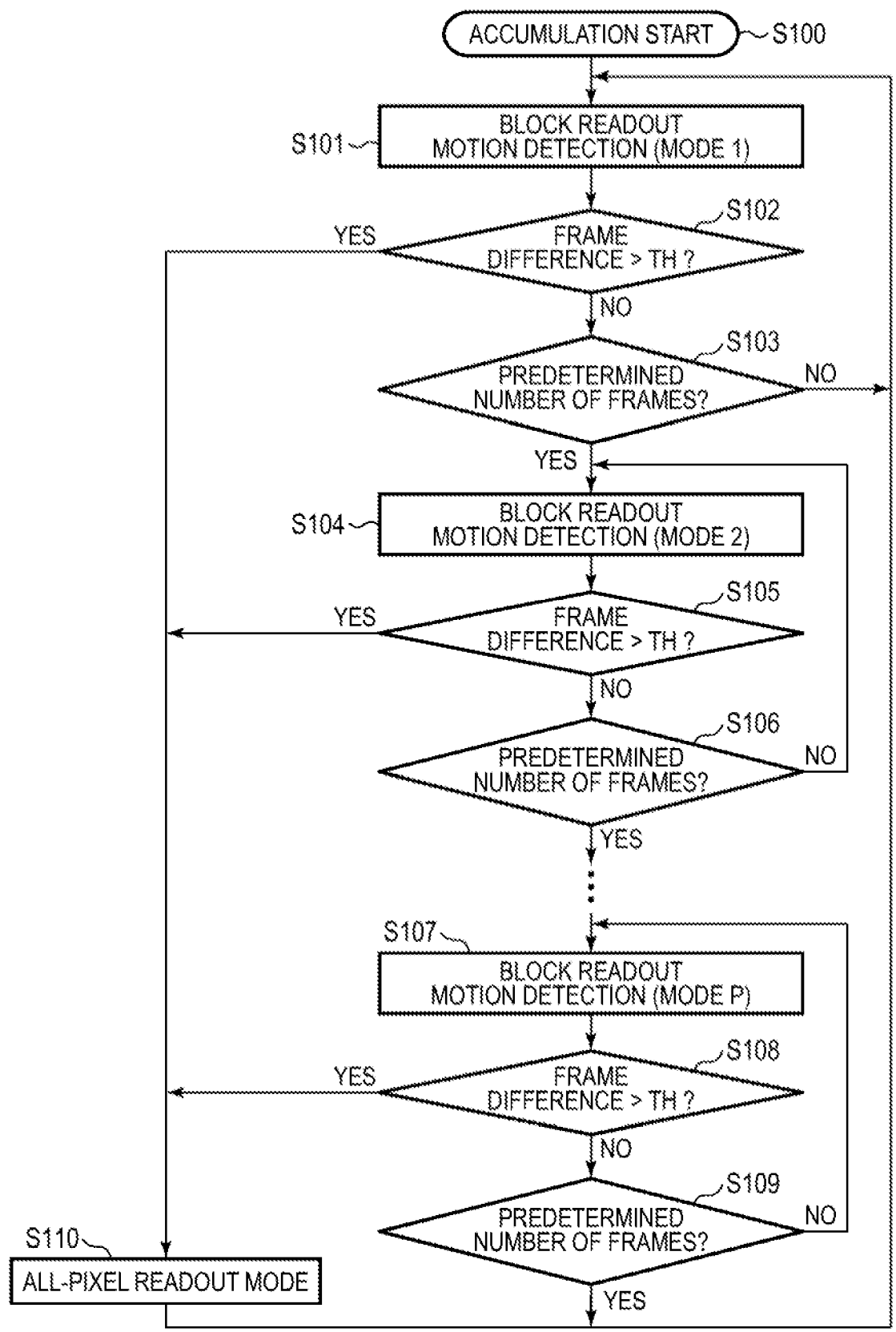
FIG. 7 is a flowchart illustrating a drive method of the imaging device in the first embodiment of the present invention.

FIG. 7 is a flowchart illustrating a drive method of the imaging device in the present embodiment, which illustrates a readout method of signals in a motion detection period (motion detection mode). The imaging device 100 can sequentially perform a plurality of modes of different modes of division patterns of pixel blocks.

In step S100, the control unit 110 in the imaging system starts an operation in accordance with a predetermined program. The control unit 110 starts up the imaging device 100, and the imaging device 100 starts accumulation of charges based on an incident light.

In step S101, the control unit 110 sets an operation mode of the motion detection and the block readout to a mode 1 (first mode) and provides a signal indicating the mode 1 to the imaging device 100. The control circuit 7 of the imaging device 100 starts block readout in accordance with a signal of the mode 1. Here, the block readout by the mode 1 is a readout operation by the first division pattern divided into pixel blocks BL of m rows and n columns, for example. In the mode 1, the number of pixel blocks BL in one frame is the smallest, and the number of pixels binned in one pixel blocks BL is the largest. It is therefore possible to reduce the current consumption in the imaging device 100.

In step S102, the control unit 110 performs motion detection on image data of a plurality of frames. That is, the control unit 110 compares signals of particular pixel blocks BL between a plurality of frames and determines whether or not a signal difference between a plurality of frames (change in signal values) exceeds a predetermined threshold TH. It is preferable that a plurality of frames to be compared be a plurality of continuous frames having the pixel blocks BL of the same division pattern, such as the first and second frames of FIG. 6. In the first frame, the difference is not calculated, and the determination result is NO. If the signal difference between the frames exceeds the threshold TH (step S102, YES), the control unit 110 determines that the relative position of a subject relative to the background has changed, and the operation of the imaging device 100 transitions to an all-pixel readout mode (third mode) (step S110). In the all-pixel readout mode, the imaging device 100 reads out a signal in a pixel basis and outputs high-definition image data without performing addition readout of the plurality of pixels 10. Note that, instead of performing readout for each pixel 10, addition readout in the pixel blocks BL that are smaller than the pixel blocks BL in the mode 1 may be performed. Further, the resolution (the number of bits) and the frame rate of the ADC circuit 4 may be improved in the all-pixel readout mode compared to the mode 1.

In the all-pixel readout mode, the image system outputs high-definition image data in which a subject is captured to the storage medium 108 or an external device. Note that, under a predetermined condition such as after a predetermined time period from transition to the all-pixel readout mode or when the subject is no longer detected, the control unit 110 may cause the operation mode to transition to the mode 1 in which the motion detection is performed (step S101).

If the signal difference between frames does not exceed the threshold TH, that is, no motion is detected (step S102, NO), the control unit 110 determines whether or not the motion detection in the mode 1 has been performed for a predetermined number of frames, that is, for a predetermined period (step S103). If the motion detection in the mode 1 is not performed for a predetermined number of frames (step S103, NO), the control unit 110 repeatedly performs the block readout (step S101) and the motion detection (step S102) in the next frame.

If the motion detection in the mode 1 has been performed for a predetermined number of frames without detecting motion of the subject for a predetermined period (step S103, YES), the control unit 110 performs transition of the motion detection and the block readout operation mode to a mode 2 (second mode). The imaging device 100 starts the block readout in accordance with the mode 2 (step S104). Here, the block readout in the mode 2 is a readout operation by the second division pattern with the pixel blocks BL in the k rows and the L columns illustrated in the N-th and (N+1)-th frames of FIG. 6, for example. The number of pixels of the pixel blocks BL in the mode 2 is smaller than the number of pixels of the pixel blocks BL in the mode 1, and the number of pixel blocks BL included in one frame is larger. Therefore, the motion detection can be performed at higher accuracy compared to the mode 1.

In step S105, the control unit 110 determines whether or not the signal difference between a plurality of frames exceeds the predetermined threshold TH. It is preferable that a plurality of frames to be compared be a plurality of consecutive frames having the pixel blocks BL of the same pattern, such as the N-th and (N+1)-th frames of FIG. 6. If the signal difference between the frames exceeds the threshold TH, that is, if motion is detected (step S105, YES), the control unit 110 performs transition of the operation of the imaging device 100 to the all-pixel readout mode (step S110).

If the signal difference between frames does not exceed the threshold TH, that is, no motion is detected (step S105, NO), the control unit 110 determines whether or not the motion detection in the mode 2 has been performed for a predetermined number of frames (step S106). If the motion detection in the mode 2 has not been performed for a predetermined number of frames (step S106, NO), the control unit 110 repeatedly performs the block readout (step S104) and the motion detection (step S105) in the next frame. If the control unit 110 has performed the motion detection for a predetermined number of frames in the mode 2 (step S106, YES), the control unit 110 further reduces the number of pixels of the pixel blocks BL and performs motion detection.

Subsequently, the control unit 110 and the imaging device 100 repeat the process described above while gradually reducing the size of the pixel block BL. If no motion of the subject has been detected for the predetermined number of the frames (predetermined period) (step S105, NO, and step S106, YES), the control unit 110 sets the operation mode of the motion detection and the block readout to a mode P (step S107). The mode P is an operation mode to perform the block readout and the motion detection in a predetermined minimum pixel block BL. If no motion has been detected for the predetermined number of the frames even in the smallest pixel block B1. (step S108, NO, and step S109, YES), the control unit 110 sets the operation mode to the mode 1 (step S101), and repeats the process described above.

As described above, the imaging device 100 of the present embodiment can change the division pattern such as the number of pixels of the pixel blocks BL or the arrangement on a frame basis based on the result of motion detection. In the present embodiment, since block readout can be performed inside the imaging device 100, the current consumption can be reduced. For example, when the pixel block BL is formed of m rows and n columns of the pixels 10, it is sufficient to cause only the ADC circuit 4 connected to any of the column signal lines L1 on n columns to operate and perform reading and scanning on an m-row basis. It is therefore possible to reduce the current consumption of the imaging device 100 by increasing the size of the pixel blocks BL and increasing the number of pixels to be binned. On the other hand, in order to improve motion detection accuracy between frames, the size of the pixel block BL can be reduced, and high resolution readout can be performed. In the present embodiment, by performing the motion detection while gradually reducing the pixel blocks BL, it is possible to achieve both reduction in the current consumption and improvement in the motion detection accuracy.

Note that, in steps S102, S105, and S108, although the threshold TH for the motion detection may be the same for all the modes, it may beset to the optimal values for respective modes. Similarly, in steps S103, S106, and S109, although the number of frames used as a determination criterion may be the same for all the modes, it may be set to the optimal values for respective modes.

Further, in the pixel blocks BL on m rows and n columns, one of the addition in the row direction and the addition in the column direction may be performed inside the imaging device 100, and the other addition may be performed outside the imaging device 100. Also in such a case, by performing the addition inside the imaging device 100, an advantage of reduction in the current consumption can be obtained. Furthermore, instead of adding signals of all the pixels 10 forming the pixel blocks BL, the average value of signals of any of the pixels 10 in the pixel blocks BL, or signals of some of the pixels 10 may be used as a representative value of the pixel block BL. Further, in FIG. 5, while the switches M5 are turned off, the select transistors M4 on a plurality of rows may be simultaneously turned on to read out signals on a plurality of rows. When the voltages of signals of a plurality of rows simultaneously output to the column signal lines L1 are close to each other, the average value of the plurality of signals is output to the column signal lines L1. When a certain signal is particularly large out of the simultaneously selected rows, the maximum pixel value is output. The average value or the maximum value of pixel values on a plurality of rows may be used for motion detection between frames as a representative value of the pixel blocks BL.

Second Embodiment

Figure 8:
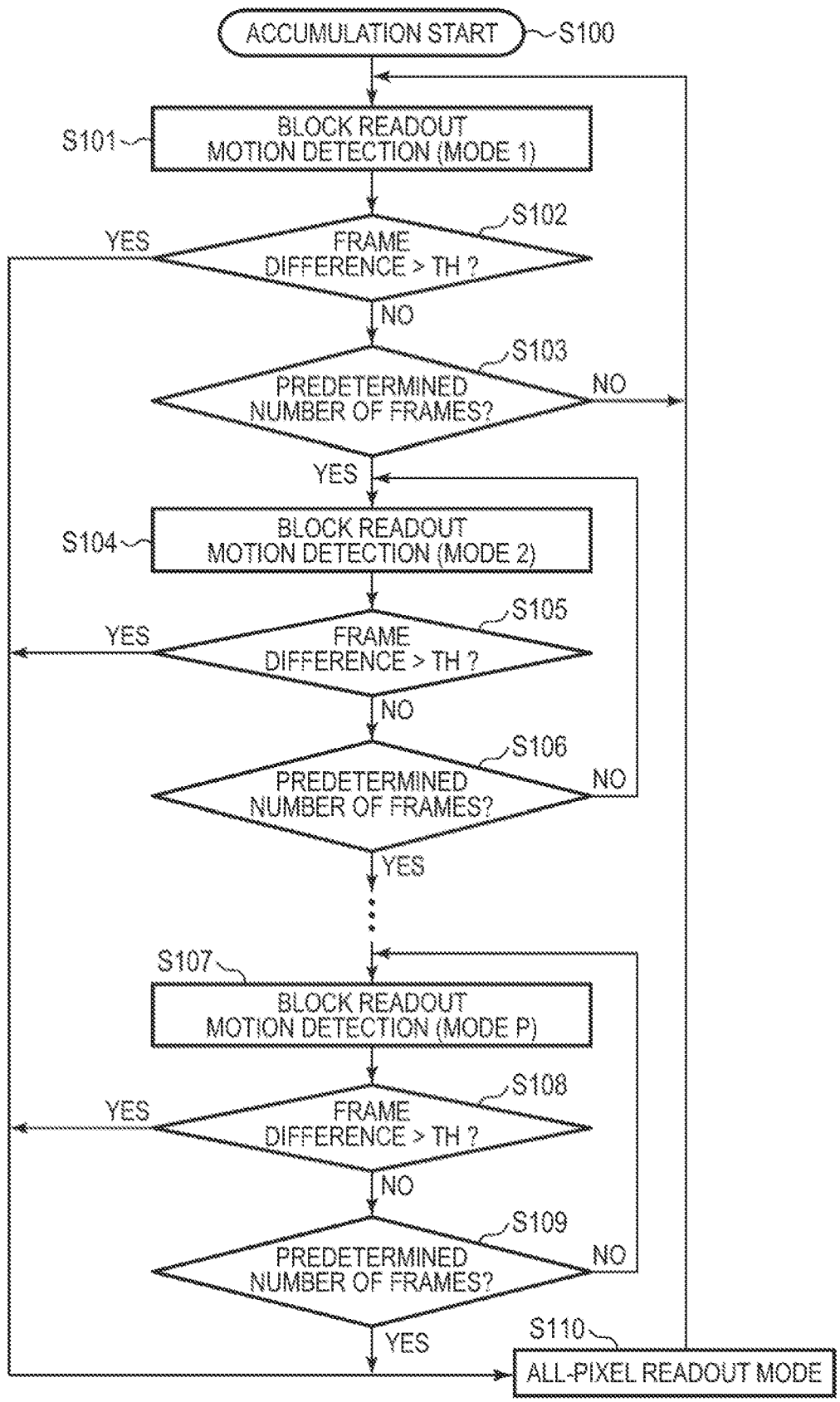
FIG. 8 is a flowchart illustrating a drive method of an imaging device in a second embodiment of the present invention.

FIG. 8 is a flowchart illustrating a drive method of an imaging device in the present embodiment, which illustrates a method of reading out a signal in a motion detection period (motion detection mode). Features different from that of the first embodiment will be mainly described below. Features other than the above has the same configuration as that of the first embodiment. All the description on the first embodiment is applied to a section of the same configuration as that of the first embodiment.

If no motion has been detected for a predetermined number of frames also in the smallest pixel block BL (step S108, NO, and step S109. YES), the control unit 110 causes the operation mode to transition to the all-pixel readout mode (step S110). After predetermined time has elapsed from transition to the all-pixel readout mode, and the control unit 110 causes the operation mode to transition to the mode 1 of performing motion detection (step S101). At this time, transition to any one of the mode 2 to the mode P may be employed other than the mode 1. Alternatively, which mode to transition may be selected in accordance with a predetermined condition.

Note that, in FIG. 8, the all-pixel readout mode (step S110) is performed for every time a cycle of process from the mode 1 to the mode P is performed (steps S101 to S109). In contrast, the all-pixel readout mode (step S110) may be performed for each multiple times of processes from the mode 1 to the mode P. That is, if the total number of frames from the start of operation does not reach a predetermined number of frames after the process of the mode P (step S109, NO), the control unit 110 may transition to the mode 1 without performing the all-pixel readout (step S110) of step S110 (step S101). On the other hand, if the total number of frames from the start of operation reaches a predetermined number of frames, the control unit 110 may transition to the mode 1 after performing the all-pixel readout (step S110).

As described above, transition to the all-pixel readout mode is performed even when no motion has been detected for a predetermined number of frames, and thereby it is possible to perform capturing at a high resolution even on a moving object where motion detection is difficult. Note that, in the present embodiment, it is not necessary to change the size, the number, or the like of the pixel blocks BL as illustrated in the first embodiment. For example, the imaging device 100 performs block readout while always fixing a division pattern of the pixel blocks and, when no motion has been detected for a predetermined number of frames, transitions to the all-pixel readout mode. In such a configuration, an advantage that capturing at a high resolution can be performed even on a moving object where motion detection is difficult is obtained.

Third Embodiment

Figure 9:
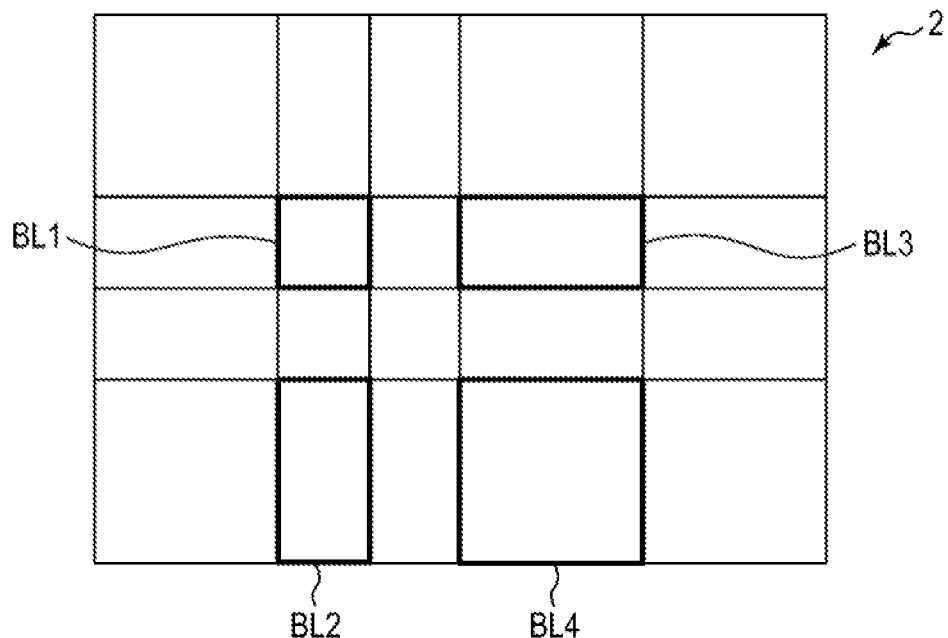
FIG. 9 is a diagram illustrating pixel blocks in a third embodiment of the present invention.
Figure 10:
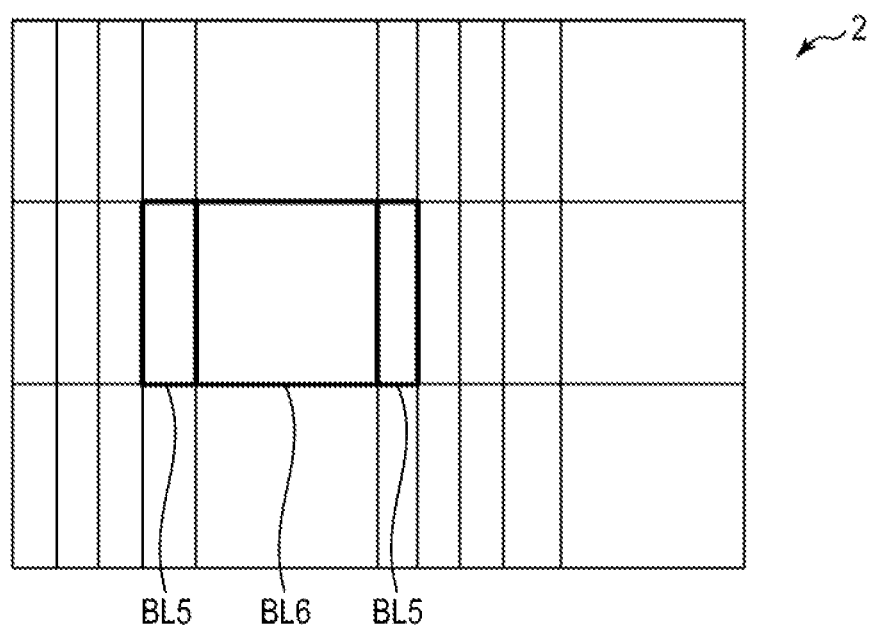
FIG. 10 is a diagram illustrating pixel blocks in the third embodiment of the present invention.

FIG. 9 and FIG. 10 are diagrams illustrating pixel blocks in the present embodiment. In the present embodiment, multiple types of pixel blocks having different number of pixels and different shape are arranged within one frame. Features different from those of the first embodiment will be mainly described below.

In FIG. 9, the pixel unit 2 is divided into multiple types of pixel blocks BL1, BL2, BL3, BL4, . . . . For example, the pixel block (first pixel block) BL1 is shaped in substantially a square and formed of a smaller number of pixels 10 than other pixel blocks (second pixel block) BL2, BL3, and BL4. The pixel block BL4 is shaped in substantially a square as with the pixel block BL1 but is formed of a larger number of pixels 10 than other pixel blocks BL1. BL2, and BL3. The pixel blocks BL2 and BL3 may be formed of the same number of pixels 10 but have different shapes from each other. In one frame, by arranging multiple types of pixel blocks having the different numbers of pixels or different shapes, it is possible to improve motion detection accuracy in any region. For example, when it is necessary to increase motion detection accuracy in a part closer to the center of the imaging region, it is preferable to reduce the number of pixels of the pixel block BL in a part closer to the center compared to a part closer to the periphery.

Further, the division pattern such as the number of pixels, the shape, the arrangement, or the like of the pixel blocks BL may be changed on a frame basis. For example, when a subject moves from a part closer to the center to a part closer to the periphery, the size of the pixel blocks BL2 and BL4 on the part closer to the periphery may be smaller than that of the pixel block BL1 at the center. Furthermore, as illustrated in FIG. 10, a pixel block BL6 having the number of pixels that is different from the number of pixels of the pixel block BL may be arranged between pixel blocks BL5 having the same number of pixels. With pixel blocks having the different number of pixels being arranged adjacently, a subject is more likely to be detected in more pixel blocks BL. Thereby, it is possible to reduce the number of pixel blocks BL in one frame and increase motion detection accuracy effectively while suppressing current consumption.

Fourth Embodiment

Figure 11:
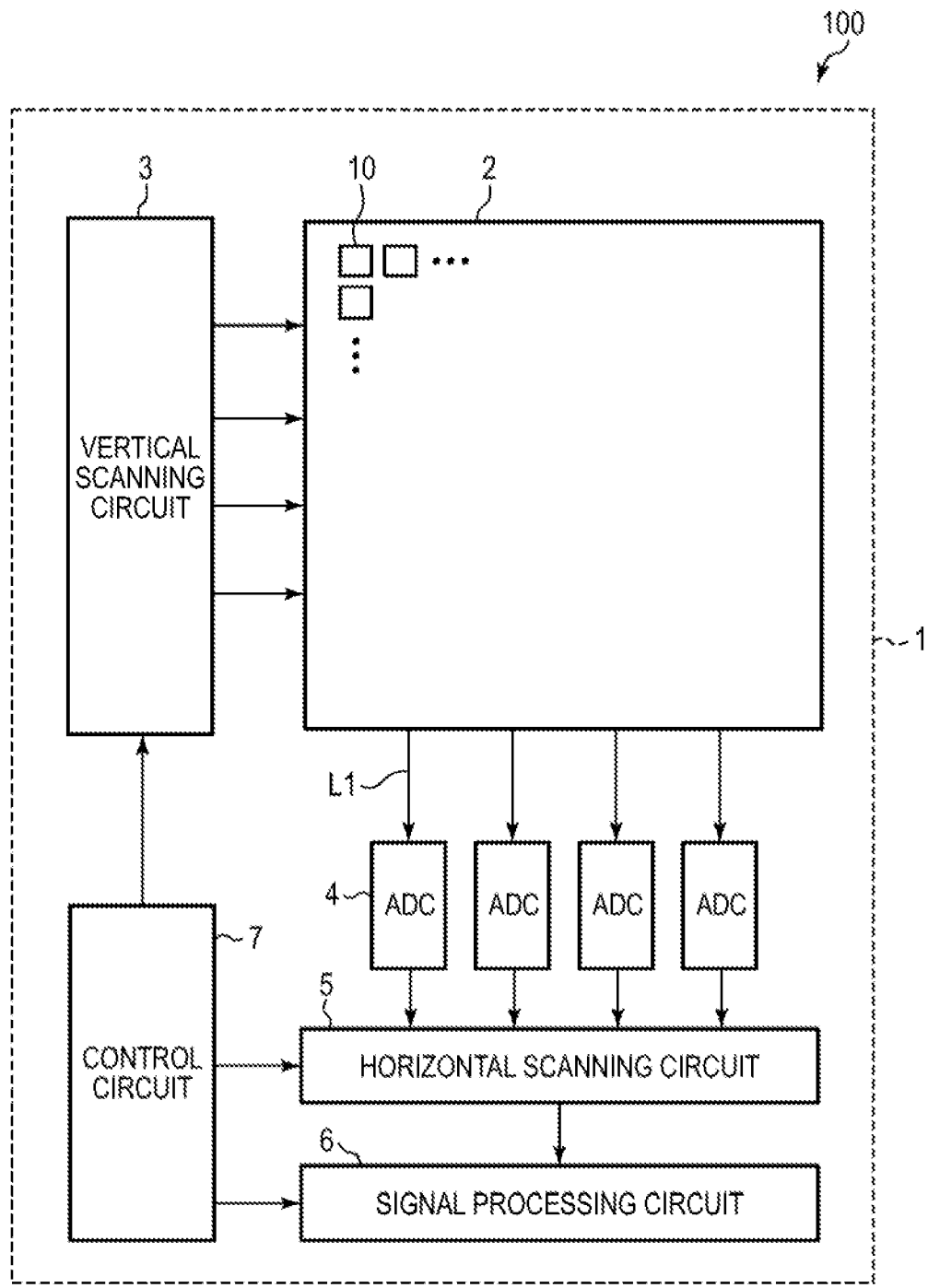
FIG. 11 is a block diagram of an imaging device in a fourth embodiment of the present invention.

FIG. 11 is a block diagram of an imaging device in the present embodiment. Features different from those of the first embodiment will be mainly described below. In the present embodiment, circuit elements forming the imaging device 100 are formed on a single semiconductor substrate 1. That is, the pixel unit 2, the vertical scanning circuit 3, the ADC circuit 4, the horizontal scanning circuit 5, the signal processing circuit 6, and the control circuit 7 are formed on the semiconductor substrate 1. When the semiconductor substrate 1 has a sufficient area, manufacturing cost can be suppressed compared to the first embodiment in which semiconductor substrates are stacked. Also in the present embodiment, it is possible to increase motion detection accuracy while reducing current consumption in a similar manner to the first embodiment.

Fifth Embodiment

Figure 12:
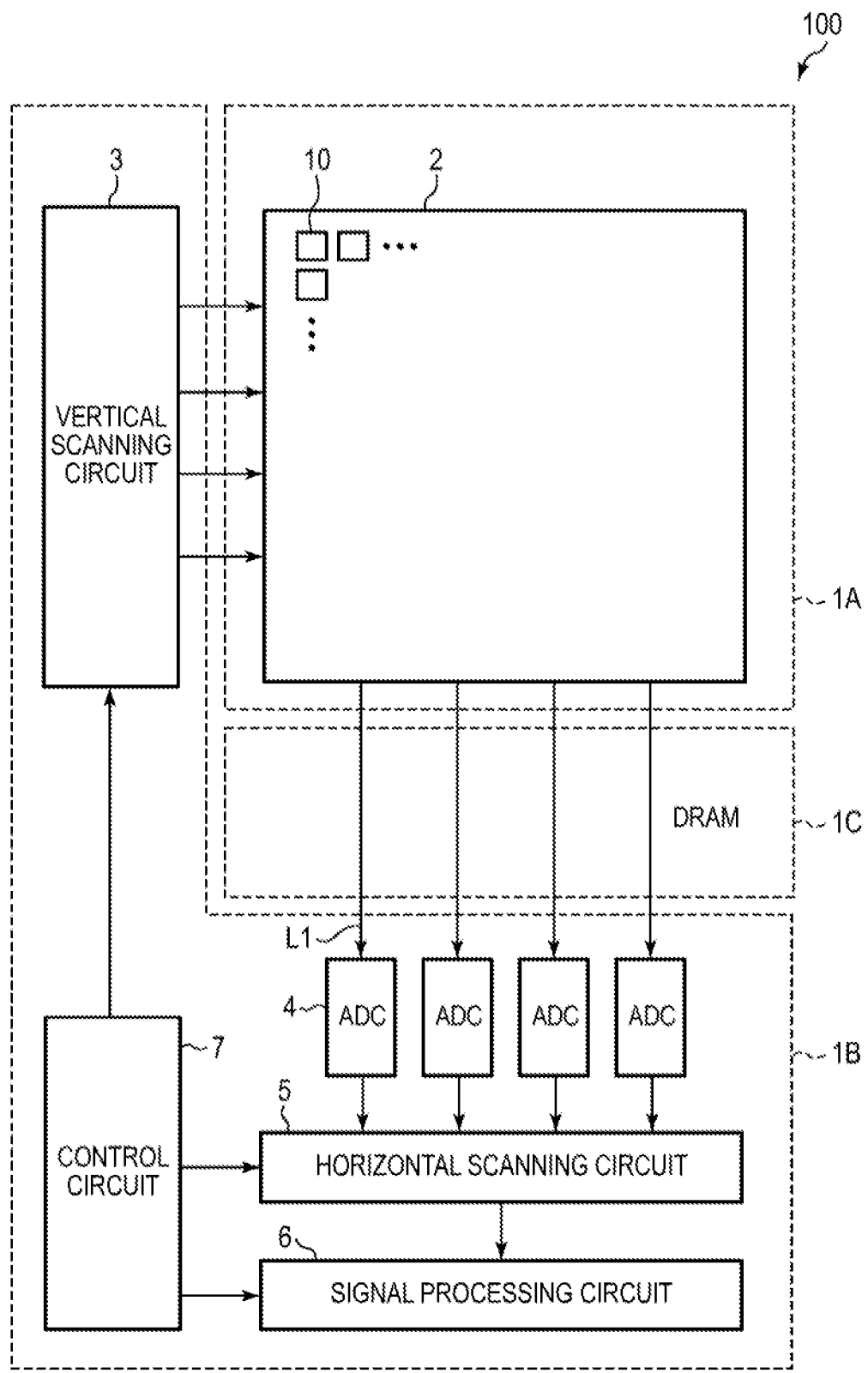
FIG. 12 is a block diagram of an imaging device in a fifth embodiment of the present invention.

FIG. 12 is a block diagram of an imaging device in the present embodiment. Features different from those of the first embodiment will be mainly described below. In the present embodiment, the imaging device 100 is formed across three stacked semiconductor substrates 1A, 1B, and 1C. The pixel unit 2 is formed in the semiconductor substrate 1A, and the vertical scanning circuit 3, the ADC circuit 4, the horizontal scanning circuit 5, the signal processing circuit 6, and the control circuit 7 are formed in the semiconductor substrate 1B. A memory circuit such as a dynamic random access memory (DRAM) is formed in the semiconductor substrate (third substrate) 1C. The DRAM temporarily stores digitally converted image data. When the rate is restricted on a signal path from the imaging device 100 to the signal processing unit 104, a signal can be read out from the pixel unit 2 at a high rate by storing image data in the DRAM. This enables capturing at a high framerate and enables accurate detection of motion of a subject moving fast.

Sixth Embodiment

Figure 13:
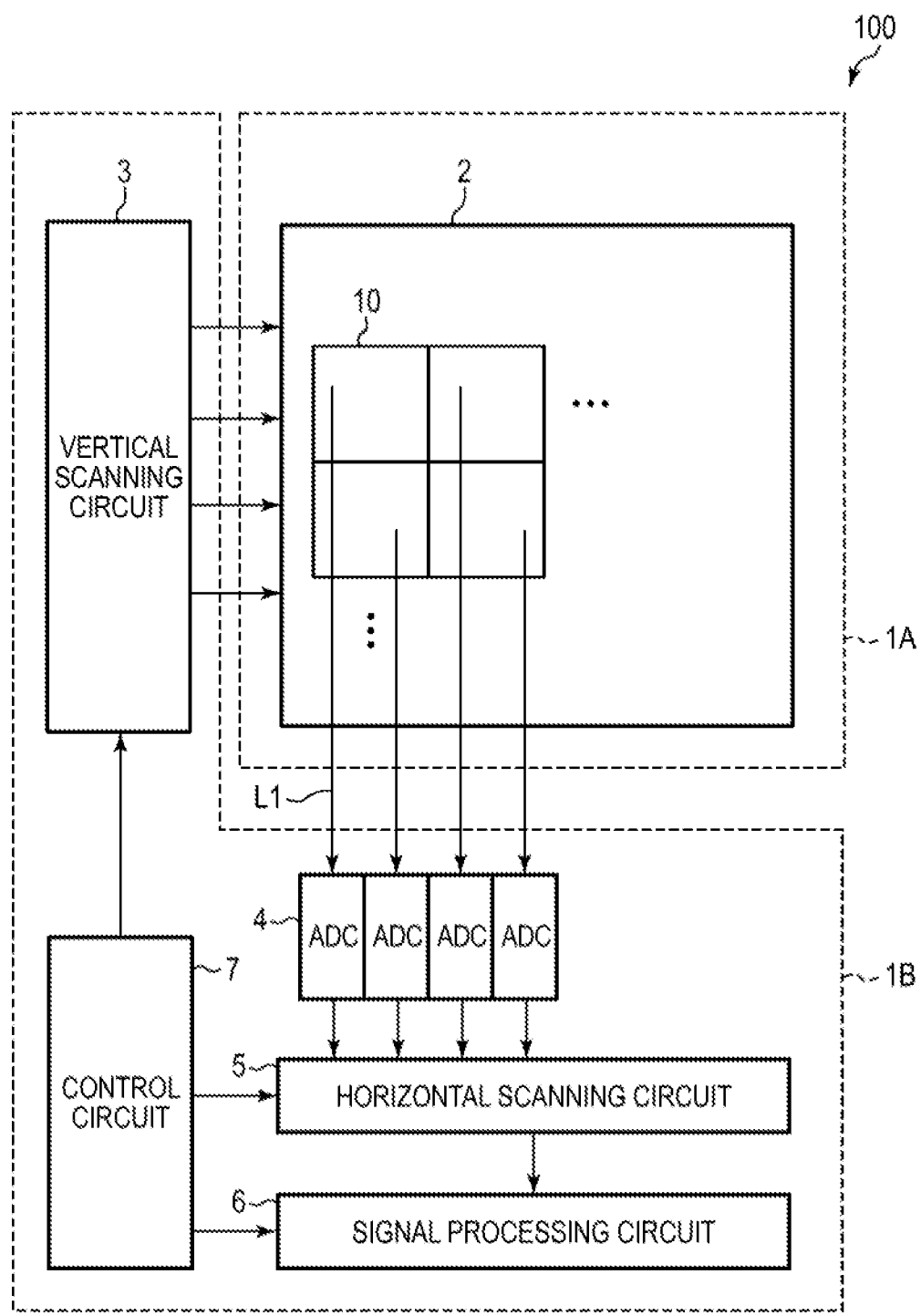
FIG. 13 is a block diagram of an imaging device in a sixth embodiment of the present invention.

FIG. 13 is a block diagram of an imaging device in the present embodiment. Features different from those of the first embodiment will be mainly described below. In the present embodiment, the ADC circuit 4 is provided for each pixel 10. Compared to the first embodiment, although the circuit size is larger, signals can be read out at a higher rate. This enables capturing at a high framerate and enables accurate detection of a subject moving fast.

Seventh Embodiment

Figure 14:
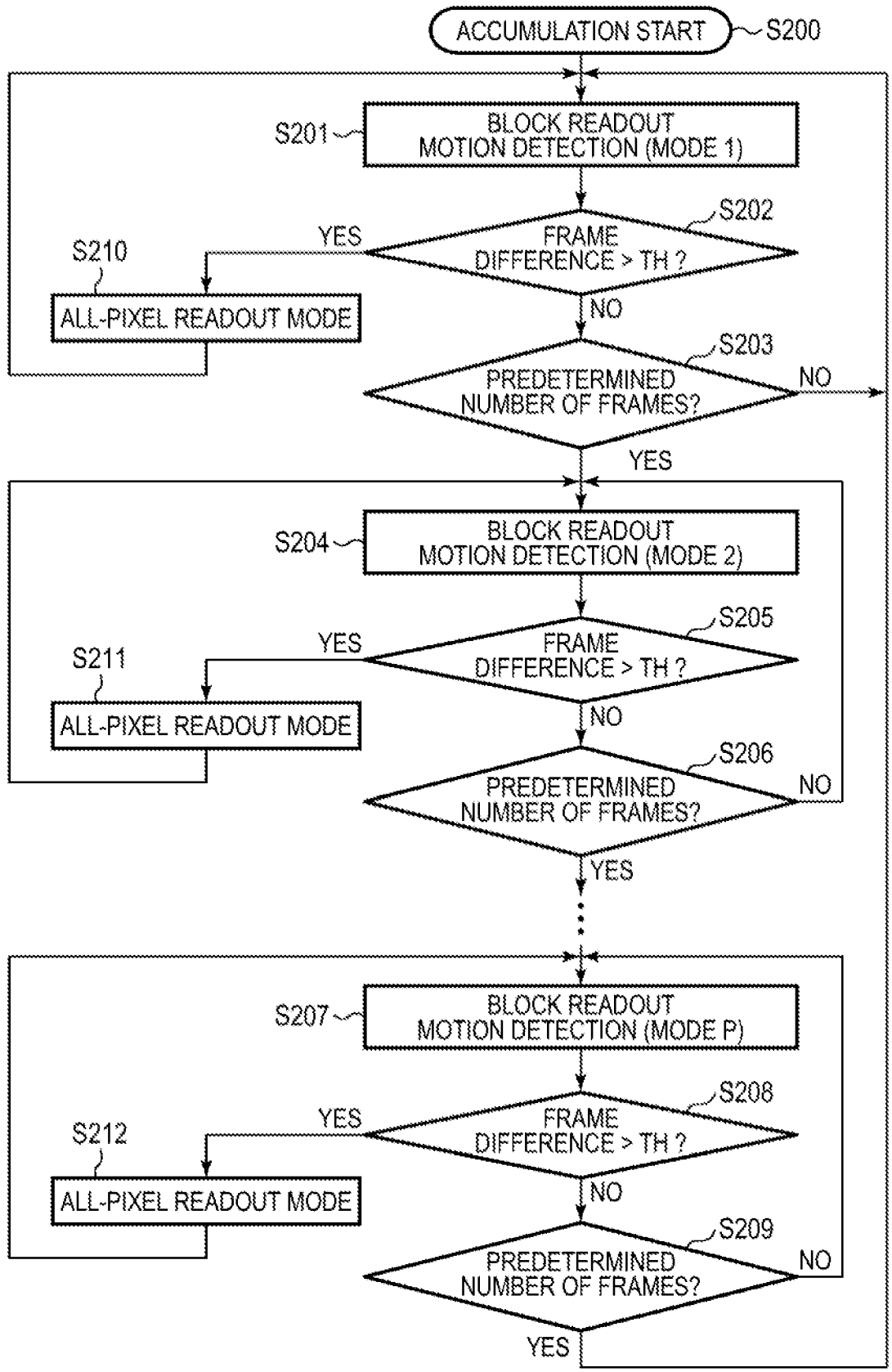
FIG. 14 is a flowchart illustrating a drive method of an imaging device in a seventh embodiment of the present invention.

FIG. 14 is a flowchart illustrating a drive method of an imaging device in the present embodiment. When performing motion detection after the all-pixel readout mode, the imaging device 100 in the present embodiment transitions to the same readout mode as the readout mode by which motion detection has been made. Features different from those of the first embodiment will be mainly described below.

In step S200, the control unit 110 starts an operation in accordance with a predefined program. The control unit 110 starts up the imaging device 100, and the imaging device 100 starts accumulation of charges based on an incident light.

In step S201, the control unit 110 sets the operation mode of motion detection and block readout to the mode 1, and the imaging device 100 starts block readout in accordance with the mode 1. In a similar manner to the first embodiment, in block readout in accordance with the mode 1, the number of pixels included in one pixel block BL is the largest.

In step S202, the control unit 110 determines whether or not a difference of signals between a plurality of frames exceeds a predefined threshold TH. If the difference of signals between frames exceeds the threshold TH, that is, if motion is detected (step S202, YES), the control unit 110 performs transition of the operation of the imaging device 100 to the all-pixel readout mode (step S210). In all-pixel readout mode, the imaging device 100 reads out signals on a pixel basis and outputs high definition image data. Under a predetermined condition such as after predetermined time has elapsed from transition to the all-pixel readout mode or when the subject is no longer detected, the control unit 110 performs transition of the motion mode from the all-pixel readout mode to the mode 1 to perform motion detection (step S201).

If the difference of signals between frames does not exceeds the threshold TH, that is, no motion is detected (step S202, NO), the control unit 110 determines whether or not motion detection in the mode 1 has been performed for a predetermined number of frames (step S203). If motion detection in the mode 1 has not been performed for the predetermined number of frames (step S203, NO), the control unit 110 repeatedly performs block readout (step S201) and motion detection (step S202) in the next frame.

If no motion of the subject is detected and motion detection in the mode 1 is performed for the predetermined number of frames (step S203, YES), the control unit 110 performs transition of the operation mode to the mode 2 (step S204). The imaging device 100 starts block readout and motion detection in the mode 2 by using a division pattern in which the number of pixels of the pixel block BL is reduced.

If the difference of signals between frames exceeds the threshold TH, that is, if motion is detected (step S205, YES), the control unit 110 performs transition of the operation of the imaging device 100 to the all-pixel readout mode (step S211). Then, in a predetermined condition, the control unit 110 performs transition of the operation mode from the all-pixel readout mode to the mode 2 (step S204).

If the difference of signals between frames does not exceed the threshold TH, that is, if no motion is detected (step S205, NO), the control unit 110 determines whether or not motion detection in the mode 2 has been performed for a predetermined number of frames (step S206). If motion detection in the mode 2 has not been performed for the predetermined number of frames (step S206, NO), the control unit 110 repeatedly performs block readout (step S204) and motion detection (step S205) in the next frame. If motion detection in the mode 2 has been performed for the predetermined number of frames (step S206, YES), the control unit 110 performs block readout and motion detection by using a division pattern in which the number of pixels of the pixel block BL is reduced.

Then, the control unit 110 and the imaging device 100 repeat the process described above while gradually reducing the size of the pixel block BL. If no motion has been detected, the control unit 110 sets the operation mode of the motion detection and block readout to the mode P (step S207). The mode P is an operation mode to perform block readout and motion detection in the predefined smallest pixel block BL.

If the difference of signals between frames exceeds the threshold TH, that is, if motion is detected (step S208, YES), the control unit 110 performs transition of the operation of the imaging device 100 to the all-pixel readout mode (step S212). Then, in a predetermined condition, the control unit 110 performs transition of the operation mode from the all-pixel readout mode to the mode P (step S207). Also in the smallest pixel block BL, if no motion has been detected for a predetermined number of frames (step S208, NO, and step S209, YES), the control unit 110 sets the operation mode to the mode 1 (step S201).

In the present embodiment, when the all-pixel readout mode is transitioned to the block readout mode, the mode is transitioned again to the same mode as the mode in which motion detection has been performed. For example, when motion is detected in the mode 2 and the all-pixel readout mode is entered, the block readout mode that is subsequently performed is the mode 2. In such a way, when motion detection is performed after the all-pixel readout mode, the same readout mode as the readout mode at the time of the detection of motion is performed. If motion of a subject is repeatedly detected in the same region within an image, by performing motion detection using the same readout mode, it is possible to perform motion detection effectively. As a result, it is possible to increase the speed and accuracy of motion detection.

Eighth Embodiment

Figure 15:
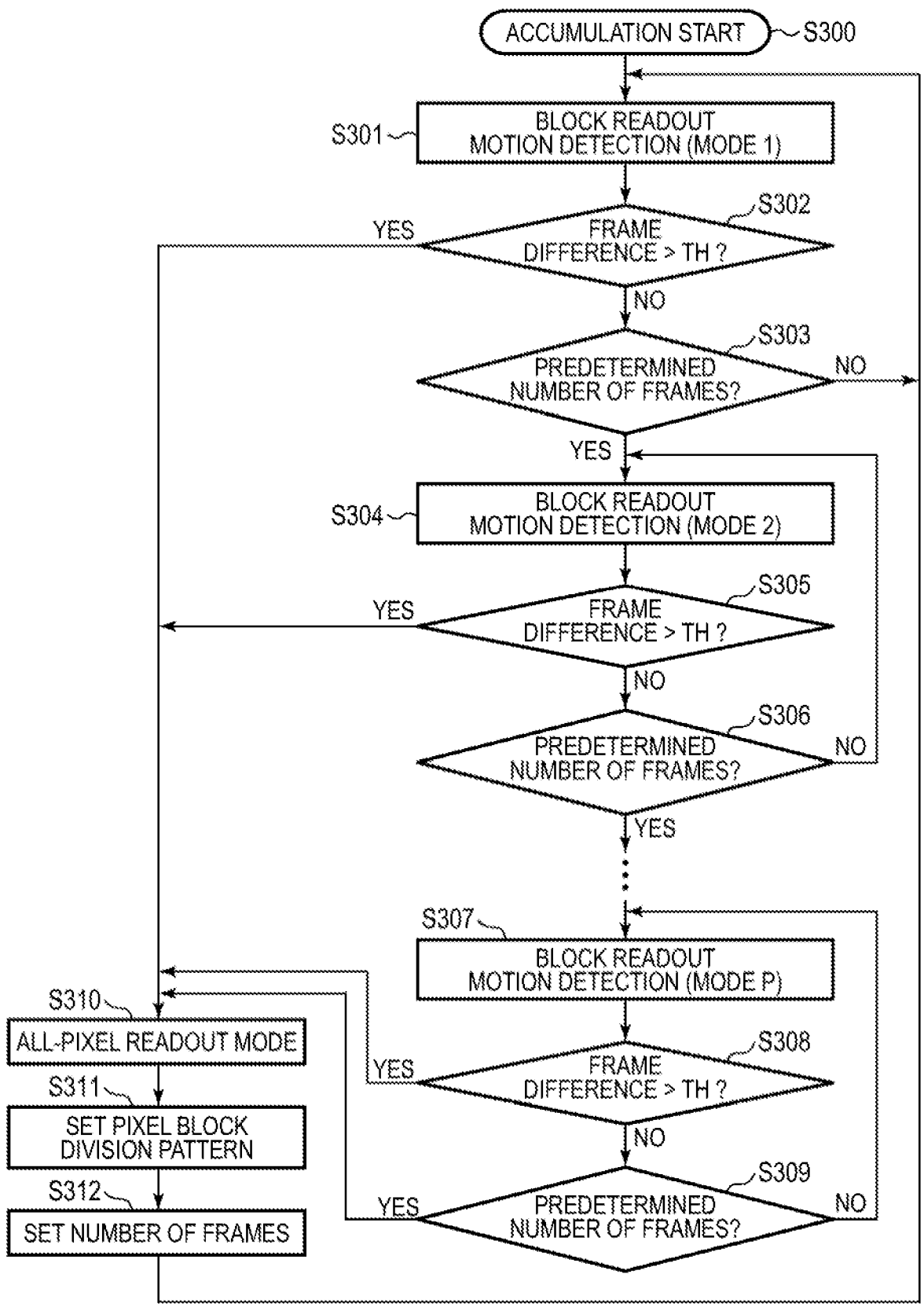
FIG. 15 is a flowchart illustrating a drive method of an imaging device in an eighth embodiment of the present invention.

FIG. 15 is a flowchart illustrating a drive method of an imaging device in the present embodiment. The imaging system in the present embodiment can change the number of frames of motion determination and the pattern of pixel blocks based on a previous motion detection result when the motion detection mode is recovered from the all-pixel readout mode. Features different from those of the first and sixth embodiments will be mainly described below.

The process from step S300 to step S309 is substantially the same as that of the first and sixth embodiments. The difference of signals between a plurality of frames exceeds the threshold TH (steps S302, S305, S308, YES), the control unit 110 performs transition of the operation of the imaging device 100 to the all-pixel readout mode (step S310). After predetermined time has elapsed from transition to the all-pixel readout mode or under a predetermined condition, the control unit 110 performs the process on and after step S311 for motion detection again.

In step S311, the control unit 110 re-set a division pattern such as the number of pixels, the arrangement, or the like of pixel blocks based on a motion detection result (step S302, S305, or S308). For example, it is assumed that, if the division pattern in the mode 2 is used as a result of repetition of motion detection of steps S301 to S309 performed by the control unit 110 (step S304), the frequency that motion of the subject is detected increases. In this case, the control unit 110 changes the division pattern in some frames of the mode 1 and the mode P in the same manner as in the mode 2 (steps S301, S307). Further, pixel blocks in the mode 2 may be divided more finely. Note that a motion detection result may be stored in the memory of the imaging system or the imaging device 100.

In step S312, the control unit 110 re-sets the number of frames in the determination of the number of frames (step S303, S306, or S309) based on the motion detection result (S302, S305, or S308). For example, it is assumed that, if motion detection in the mode 2 is performed as a result of repetition of motion detection of steps S301 to S309 performed by the control unit 110 (step S305), the frequency that motion of the subject is detected increases. In this case, the control unit 110 increases the number of determination frames in the mode 2 (step S306). That is, by increasing the rate (the number of times) of processes of a mode in which the frequency of motion detection is high, it is possible to increase the speed and accuracy of motion detection.

Subsequently, the control unit 110 repeats motion detection of steps S301 to S309 by using the setting value of the division pattern of pixel blocks and the number of frames. Furthermore, the control unit 110 can learn the optimum setting value while repeating motion detection. As described above, by re-setting a division pattern of the pixel block and the number of determination frames based on a result of motion detection and by increasing the ratio of the step of signal readout in which the frequency of motion detection is high, it is possible to increase the speed and accuracy of motion detection.

Ninth Embodiment

In the present embodiment, an example which is further expanded from the eighth embodiment will be described mainly for features different from the eighth embodiment. A drive method of the present embodiment is substantially the same as the drive method illustrated in the flowchart of FIG. 15 described in the eighth embodiment but is different in a division pattern of the pixel blocks. The division pattern simplified into modes 1 to 3 will be described below. When performing motion detection of steps S301 to S309 for the first time, the control unit 110 performs motion detection in the order of the mode 1, the mode 2, and the mode 3.

Figure 16:
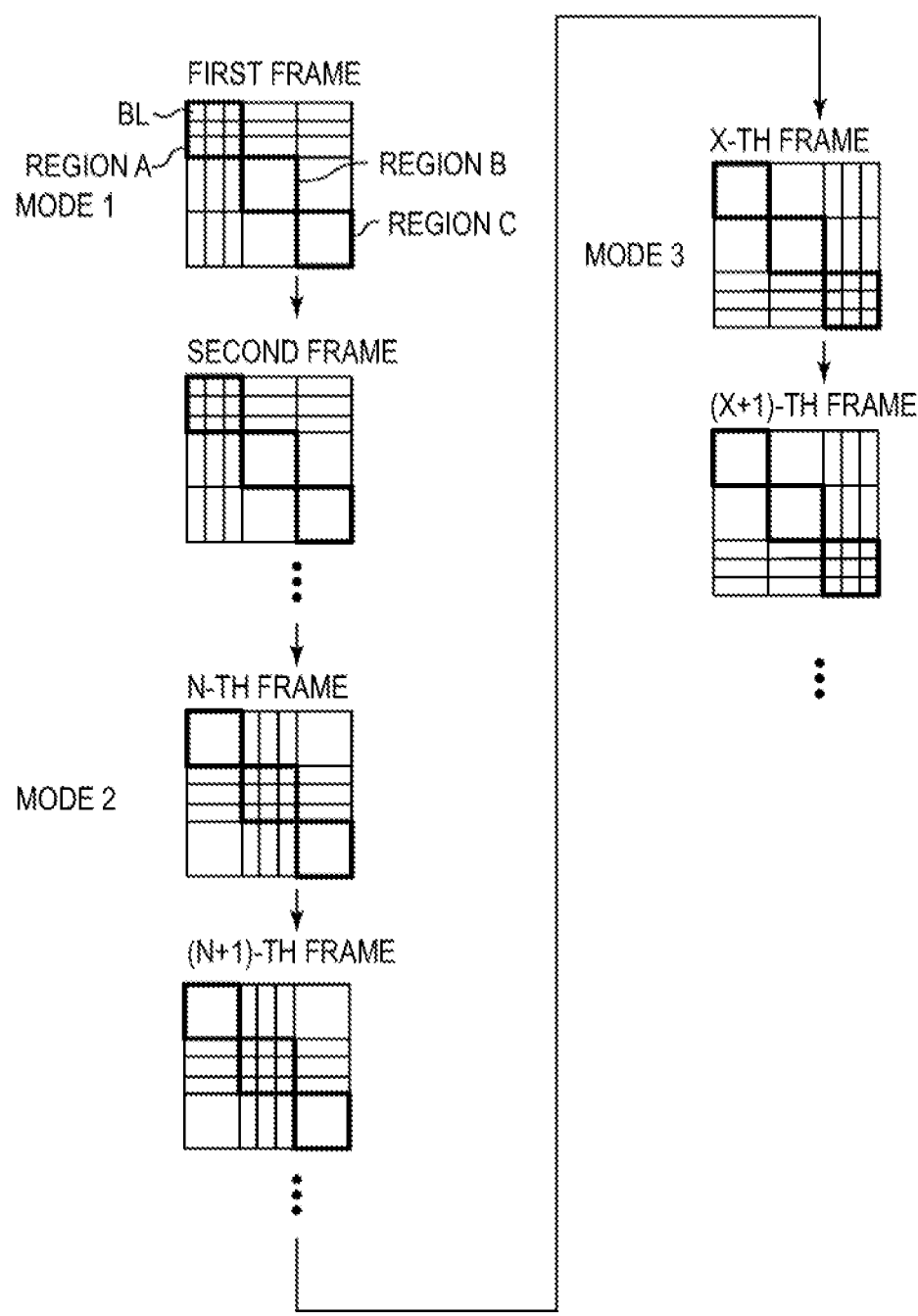
FIG. 16 is a diagram illustrating a readout method of a pixel unit in a ninth embodiment of the present invention.

FIG. 16 is a diagram illustrating a readout method of the pixel unit in the present embodiment, which illustrates the initial division pattern of pixel blocks. Each frame is read out in the order of first, second, . . . , N-th, (N+1)-th, . . . , X-th, and (X+1)-th. For the purpose of illustration, the region A, the region B, and the region C are pixel regions of the same size. In the first and second frames corresponding to the mode 1, the number of pixel blocks forming the left-upper region A in the pixel unit 2 is larger than the number of pixel blocks forming the center region B and the right-lower region C. In other words, the number of pixels included in a single pixel block in the region A is smaller than the number of pixels included in a single pixel block in the region B or the region C. Thus, the motion detection accuracy is higher in the region A than in the region B or the region C. Similarly, in the N-th and the (N+1)-th frames corresponding to the mode 2, the number of pixel blocks forming the center region B in the pixel unit 2 is larger than the number of pixel blocks forming the left-upper region A and the right-lower region C. Thus, the motion detection accuracy is higher in the region B than in the region A and the region C. In the X-th and the (X+1)-th frames corresponding to the mode 3, since the number of pixel blocks forming the right-lower region C in the pixel unit 2 is larger than the number of pixel blocks forming the left-upper region A and the center region B, the motion detection accuracy is higher in the region C than in the region A and the region B. Note that, while only the regions A to C are representatively indicated in FIG. 16, more regions may be set to the imaging area.

Here, a case where no moving object is detected in FIG. 16 in any mode as a result of repetition of motion detection of steps S301 to S309 (step S309, YES) will be described. In this case, moving object detection may be continued without changing the setting of a division pattern of pixel blocks and the number of frames in steps S311 and S312. Alternatively, a setting to change the division pattern of pixel blocks or the number of frames may be employed. A method of such a change may be set in advance, or such a change may be set at random.

Next, a case where a moving object is detected in any of the modes as a result of repetition of motion detection of steps S301 to S309 will be described. If a moving object is detected (any of steps S302, S305, and S308, YES), the control unit 110 performs transition to the all-pixel readout mode (step S310). Then, in the same manner as the case where no moving object is detected, in steps S311 and S312, moving object detection may be continued without changing the setting of a division pattern of pixel blocks and the number of frames. Alternatively, the division pattern of pixel blocks or the number of frames may be set to be changed.

The control unit 110 may set the optimum division pattern and the number of frames based on statistical data of detection results while repeating motion detection. For example, during repetition of motion detection, when the frequency that motion detection is performed in the mode 1 is high, a ratio of appearance of the mode 1 can be increased as with the order of mode 1, mode 2, mode 1, mode 3, mode 1, mode 2, mode 1, . . . . When the probability of a moving object being detected is high in a particular region, it is possible to increase the frequency of detection in that region and detect a moving object more effectively.

Further, during repetition of motion detection, when the order of modes in which motion is detected is characterized, it is possible to change the order of appearance of modes by re-setting a division pattern such as the number, the arrangement, or the like of pixels in a pixel block in step S311.

For example, it is assumed that, after motion of a subject is detected in the mode 3 as a result of repetition of motion detection of steps S301 to S309 by the control unit 110, and the next mode in which the frequency that motion of the subject is detected is high is the mode 2. Furthermore, it is assumed that, after motion of a subject is detected in the mode 2, and the next mode in which the frequency that motion of the subject is detected is high is the mode 1. In such a case, the control unit 110 may re-set a division pattern such as the number, the arrangement, or the like of pixels in a pixel block so as to have the order of the initially set the mode 3, the mode 2, and then the mode 1 for the division pattern of the pixel block.

Figure 17:
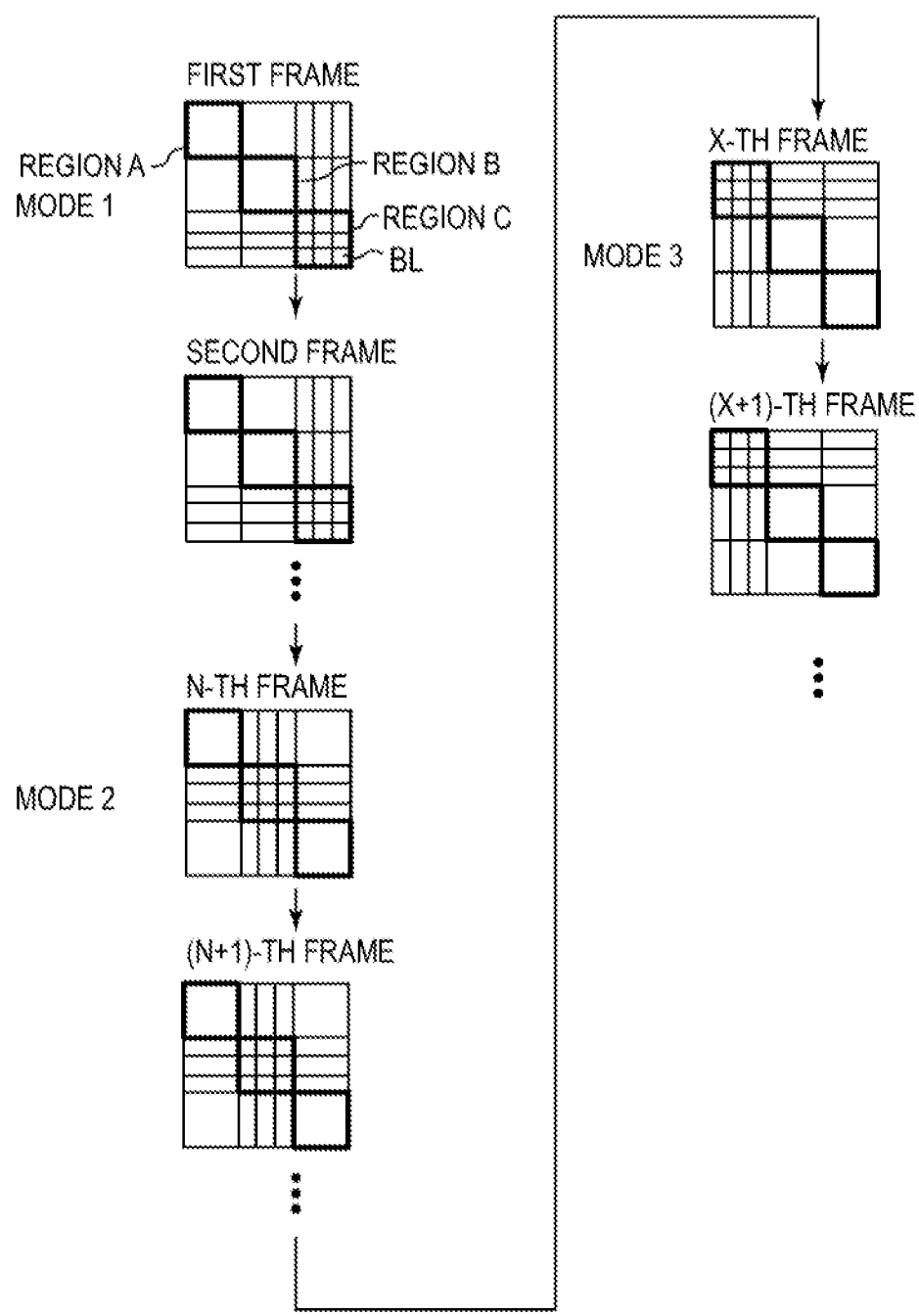
FIG. 17 is a diagram illustrating the readout method of the pixel unit in the ninth embodiment of the present invention.

FIG. 17 is a diagram illustrating a readout method of the pixel unit in the present embodiment, which illustrates a division pattern resulted after the division pattern of the pixel block is re-set. Frames are read out in the order of first, second, . . . , N-th, (N+1)-th, . . . , X-th, and (X+1)-th. In the first and second frames corresponding to the mode 1, since the number of pixel blocks forming the right-lower region C in the pixel unit 2 is larger than the number of pixel blocks forming the left-upper region A and the center region B, the motion detection accuracy is higher in the region C than in the region A and the region B. In the N-th and (N+1)-th frames corresponding to the mode 2, since the number of pixel blocks forming the center region B in the pixel unit 2 is larger than the number of pixel blocks forming the left-upper region A and the right-lower region C, the motion detection accuracy is higher in the region B than in the region A and the region C. In the X-th and (X+1)-th frames corresponding to the mode 3, since the number of pixel blocks forming the left-upper region A in the pixel unit 2 is larger than the number of pixel blocks forming the center region B and the right-lower region C, the motion detection accuracy is higher in the region A than in the region B and the region C.

As described above, by changing the order of division pattern of pixel blocks so that the frequency of motion detection increases, it is possible to increase the speed and accuracy of motion detection. For example, when a subject moves from the right-lower of a screen to the left-upper of the screen, the division pattern illustrated in FIG. 17 may be re-set.

Figure 18:
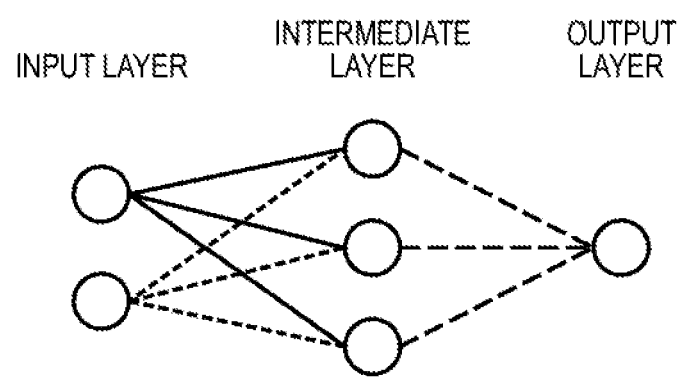
FIG. 18 is a diagram of a machine learning model in the ninth embodiment of the present invention.

Further, by classifying a subject from image information obtained at motion detection and performing machine learning, it is also possible to predict motion of the subject and re-set a division pattern such as the number of pixels, the arrangement, or the like of pixel blocks. FIG. 18 illustrates a schematic diagram of a neural network of a machine learning model in the present embodiment. The machine learning model may be learned by the control unit 110, for example, and stored in the memory unit 105. The neural network has an input layer having a plurality of nodes, an intermediate layer having a plurality of nodes, and an output layer having a single node. An image captured in the all-pixel mode may be input to each node of the input layer. Each node of the intermediate layer is connected to each node of the input layer. Each element of an input value input to the nodes of the intermediate layer is used in calculation in each node of the intermediate layer. For example, each node of the intermediate layer calculates an operation value by using an input value input from each node of the input layer, a predetermined weighting coefficient, and a predetermined bias value. Each node of the intermediate layer is connected to the output layer and outputs the calculated operation value to the node of the output layer. The node of the output layer is input with an operation value from each node of the intermediate layer. The machine learning model (intermediate layer) classifies a moving object included in an image. For example, by distinguishing a difference of an identified moving object such as a human, an animal, a vehicle, or the like and predicting a size, a motion range, or a speed of the subject, it is also possible to re-setting a division pattern such as the number of pixels, the arrangement, or the like of the pixel blocks and perform an output operation from the output layer. Note that information on the pixel block in which a moving object is detected may be added as the input of the machine learning model. Thereby, a region in which a moving object is likely to be present within an image is identified, and accuracy of classification of a moving object can be improved.

Further, the output of the machine learning model may be used for identifying a subject having a close relationship with a moving object. For example, a road (on which a vehicle is likely to appear), a passage, a door, or a window (which a person is likely to enter or exit) is identified as the output of the machine learning model. Selection or switching of the modes described above is performed so that the pixel block of a region in which the above subject is present becomes smaller.

When the classified subject is not a desired subject, it is possible to improve accuracy of detecting the desired subject by transition to setting of a pixel block division pattern (step S311) without performing the all-pixel readout mode (step S310).

Note that, when an image captured in the all-pixel readout mode is input to a neural network of a machine learning model or the like and control is performed based on output of the neural network, it is neither necessary to sequentially change the size of the pixel block from the mode 1 to the mode P nor provide a plurality of pixel blocks having different sizes within one frame. Various methods are included in the present invention for setting of the pixel blocks. For example, control based on the output is not limited to the mode selection described above but may include control of the timing of transition to the all-pixel readout mode when no moving object is detected. Alternatively, the above control may be applied to control of an exposure period of the imaging device, gain control inside the imaging device, control of the framerate, or the like. Furthermore, the above control may be applied to control of a period for the output of the all-pixel mode when a moving object is detected.

Information on input and output of a machine learning model is not limited to the example described above. In addition to an image, various information (conditions) such as capturing time, a capturing place, or the like may be input, and the optimum division pattern and the number of pixels of pixel blocks may be output in each condition. By feeding back a result of moving object detection to a machine learning model and updating each weighting coefficient between respective nodes, it is possible to perform learning of the division pattern and the number of pixels of pixel blocks by which a moving object can be detected most effectively in various conditions. The node of the output layer calculates a value of the output layer by using a calculated value input from each node of the intermediate layer, a weighting coefficient, and a bias value. Note that learning of a neural network may be performed by an error back propagation method, for example. Specifically, an output value resulted when data is input to the input layer and an output obtained from teaching data are compared with each other, and an error resulted from the comparison is fed back to the intermediate layer. By repeating this until the error becomes below a predetermined threshold, learning of a neural network (learning model) can be performed.

Tenth Embodiment

Figure 19:
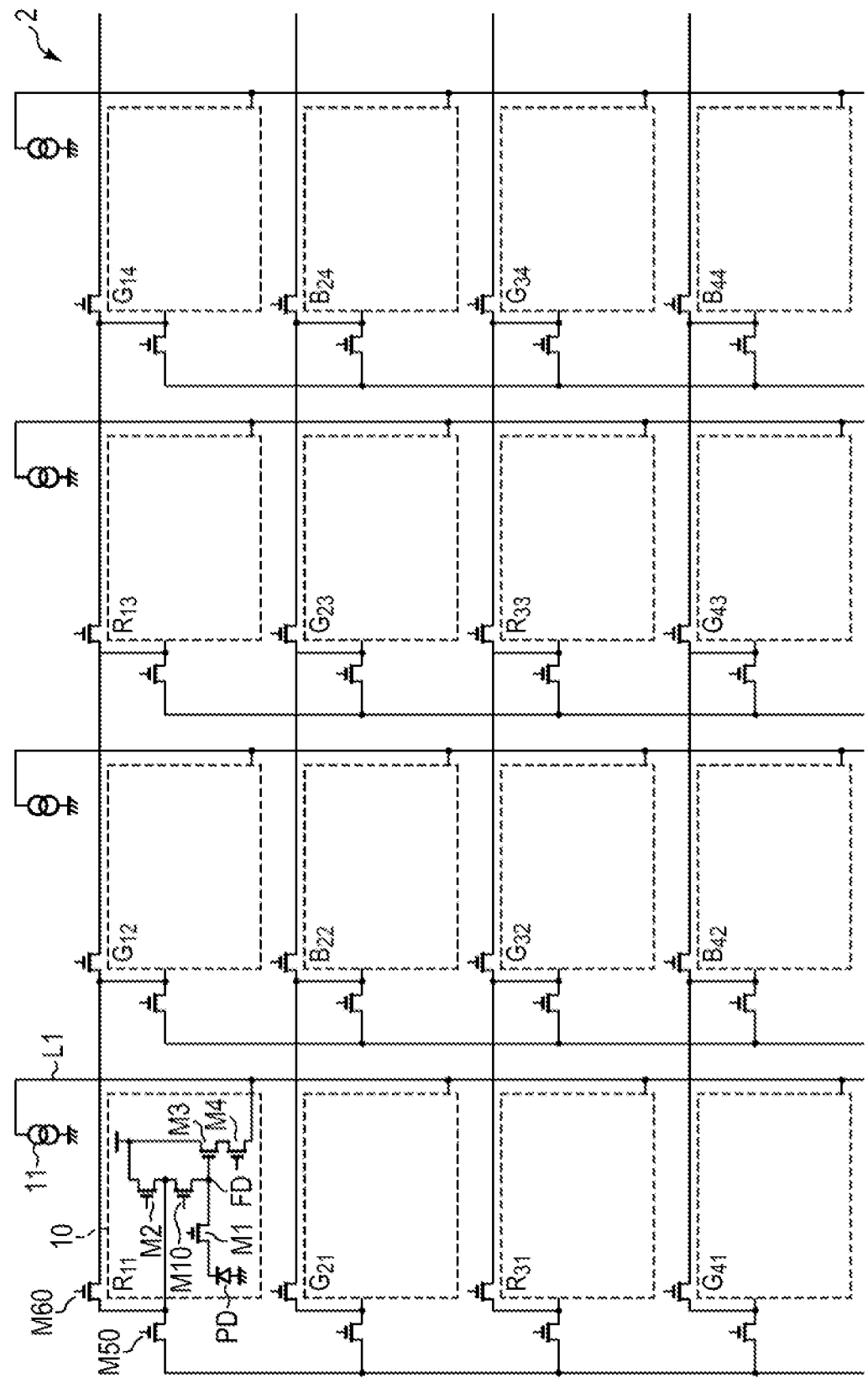
FIG. 19 is a block diagram of a pixel unit in a tenth embodiment of the present invention.

FIG. 19 is a block diagram of a pixel unit in the present embodiment. While signals of the plurality of columns are added by using switches provided between neighboring column signal lines L1 in the first embodiment, signals of pixels on a plurality of columns are added by using switches that causes floating diffusion regions of a plurality of columns to be electrically connected to or electrically disconnected from each other in the present embodiment. Features different from those in the first embodiment will be mainly described below.

The pixel 10 includes the photoelectric conversion unit PD, the transfer transistor M1, the reset transistor M2, the amplification transistor M3, the select transistor M4, a switch (fourth switch) M10, and the floating diffusion region FD. Further, a plurality of pixels 10 are connected to each other via switches (first switch) M50 and switches (third switch) M60. In the pixel 10, the source of the switch M10 is electrically connected to the floating diffusion region FD, and the drain of the switch M10 is electrically connected to the source of the switch M50, the source of the reset transistor M2, and the source of the switch M60. The drain of one of the switches M50 is electrically connected to the drains of other switches M50. Drive pulses are input to the gates of the switches M50 from the vertical scanning circuit 3.

In the motion detection mode, that is, the block readout mode to add signals, it is possible to add, it is possible to add signals of the floating diffusion regions PD of any number of pixels by controlling turning on or off of the switches M50 and M60 while turning on the switch M10. Specifically, first, the reset transistor M2 is turned on and off, and the floating diffusion region FD is reset. Then, the transfer transistors M1 is turned on and off, and optical charges of the photoelectric conversion unit PD are transferred to the floating diffusion region FD. On a plurality of rows, in response to the switches M10 and M50 being turned on, the floating diffusion regions FD on the plurality of rows are electrically connected to each other via the switches M10 and M50. Thereby, it is possible to perform addition readout in the column direction (vertical direction). Further, on a plurality of columns, in response to the switches M10 and M60 being turned on, the floating diffusion regions FD on the plurality of columns are electrically connected to each other via the switches M10 and M60. Thereby, it is possible to perform addition readout in the row direction (horizontal direction).

In the first embodiment, addition readout in the row direction is performed by causing the plurality of column signal lines L1 to be electrically connected to each other by the switches M6. In such a case, when the difference between the plurality of signals is large, the largest signal rather than the addition value of the signals may be output. For example, a state where a high intensity light enters only a certain pixel 10 and substantially no light enters other pixels is assumed. In the pixel 10 with the high intensity light, the potential of the floating diffusion region FD significantly decreases, the potential difference between the gate and the source of the amplification transistor M3 decreases, and thus the amplification transistor M3 will be turned off. On the other hand, in the each of the low intensity pixels 10, the potential of the floating diffusion region FD is maintained to a high state, and the potential of the source of the amplification transistor M3 increases. Thus, the potential of the column signal line L1 will be defined by only the low intensity pixels 10 and thus deviate from the ideal addition value (average value) of signals. Such a tendency is more significant for a larger number of column signal lines L1 used for addition, and it may be more difficult to detect motion of a small high-intensity subject.

In contrast, according to the present embodiment, by adding charges in a plurality of floating diffusion regions FD also in the row direction, it is possible to perform ideal signal addition. In particular, when the number of pixels used for addition is large in the row direction, the advantage of the present embodiment is significant. According to the present embodiment, the ideal signal addition can be performed in the horizontal direction, it is possible to increase the number of pixels used for addition in the horizontal direction.

During normal capturing, that is, in the all-pixel readout mode in which no signal addition is performed, the switches M50 and M60 are in an off-state. Further, the switch M10 is in an off-state during a readout operation other than a reset operation in each pixel 10. Specifically, during reset, the reset transistor M2 and the switch M10 are simultaneously turned on and off. After the floating diffusion region FD is reset, the switch M10 is turned off. In response to the transfer transistor M1 being turned on and off, charges are transferred from the photoelectric conversion unit PD to the floating diffusion region FD. At this time, since the switch M10 is turned off, the floating diffusion region FD is electrically isolated from the switches M50 and M60. Thereby, it is possible to prevent a signal on a neighboring column signal line L1 from being mixed to the floating diffusion region FD due to capacitance coupling or the like and avoid occurrence of color mixture. Further, it is also possible to prevent a parasitic capacitance of the switch M50 or M60 from being attached to the floating diffusion region FD and improve the SN ratio.

Eleventh Embodiment

Figure 20:
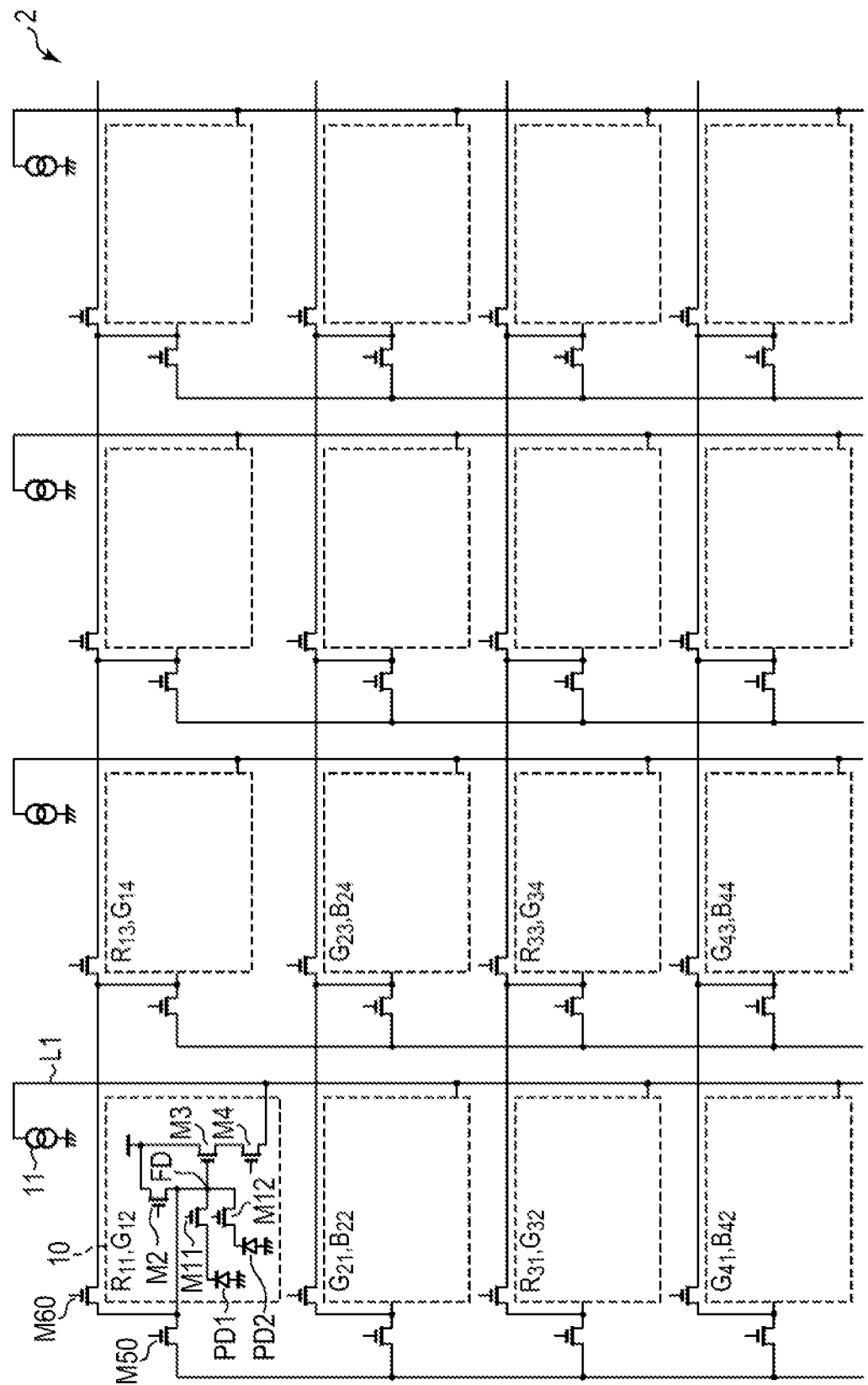
FIG. 20 is a block diagram of a pixel unit in an eleventh embodiment of the present invention.

FIG. 20 is a block diagram of a pixel unit in the present embodiment, which illustrates a modified example of the pixel unit in the eighth embodiment. Features different from those of the eighth embodiment will be mainly described below.

The pixel 10 includes photoelectric conversion units PD1 and PD2, transfer transistors M11 and M12, the reset transistor M2, the amplification transistor M3, the select transistor M4, and the floating diffusion region FD. The photoelectric conversion units PD1 and PD2 share the single floating diffusion region FD. The photoelectric conversion units PD1 and PD2 are provided with different color filters, respectively. For example, in the pixel 10 at the first row, the first column, a red color filter (R11) is provided on the photoelectric conversion unit PD1, and a green color filter (G12) is provided on the photoelectric conversion unit PD2. By turning on or off the transfer transistors M11 and M12 independently, it is possible to read out charges of the photoelectric conversion units PD1 and PD2 independently, and the pixel 10 may function as a unit pixel including two pixels 10 (R11, G12). The floating diffusion regions FD of plurality of pixels 10 are connected to each other via the switches M50 and M60. Unlike the tenth embodiment, however, no other switch is provided between the floating diffusion region FD and the switches M50 and M60.

In the motion detection mode, that is, the block readout mode in which signals are added, by simultaneously turning on the transfer transistors M11 and M12, it is possible to add and read out charges of the photoelectric conversion units PD1 and PD2. Further, as with the tenth embodiment, by controlling turning on or off of the switches M50 and M60, it is possible to connect the floating diffusion regions FD of any number of pixels to each other.

During normal capturing, that is, in the all-pixel readout mode in which no signal addition is performed, the switches M50 and M60 are in an off-state. In the present embodiment, while no switch is provided between the floating diffusion region FD and the switches M50 and M60, the colors of respective pixels 10 simultaneously read out on each row are the same and thus no color mixture occurs. For example, in readout of the pixels 10 on the first row, signals of the red pixels R11, R13, . . . are first simultaneously read out, and signals of the green pixels G12, G14, . . . are then simultaneously readout. That is, the color components of signals read out simultaneously on each row are the same. Thus, in the present embodiment, color mixture can be prevented. Note that a switch may be provided between the floating diffusion region FD and the switches M50 and M60 in the same manner as in the tenth embodiment. In such a case, it is possible to prevent interference of signals in the same color, and it is possible to reduce a parasitic capacitance attached to the floating diffusion region FD and improve the SN ratio.

Twelfth Embodiment

Figure 21A:
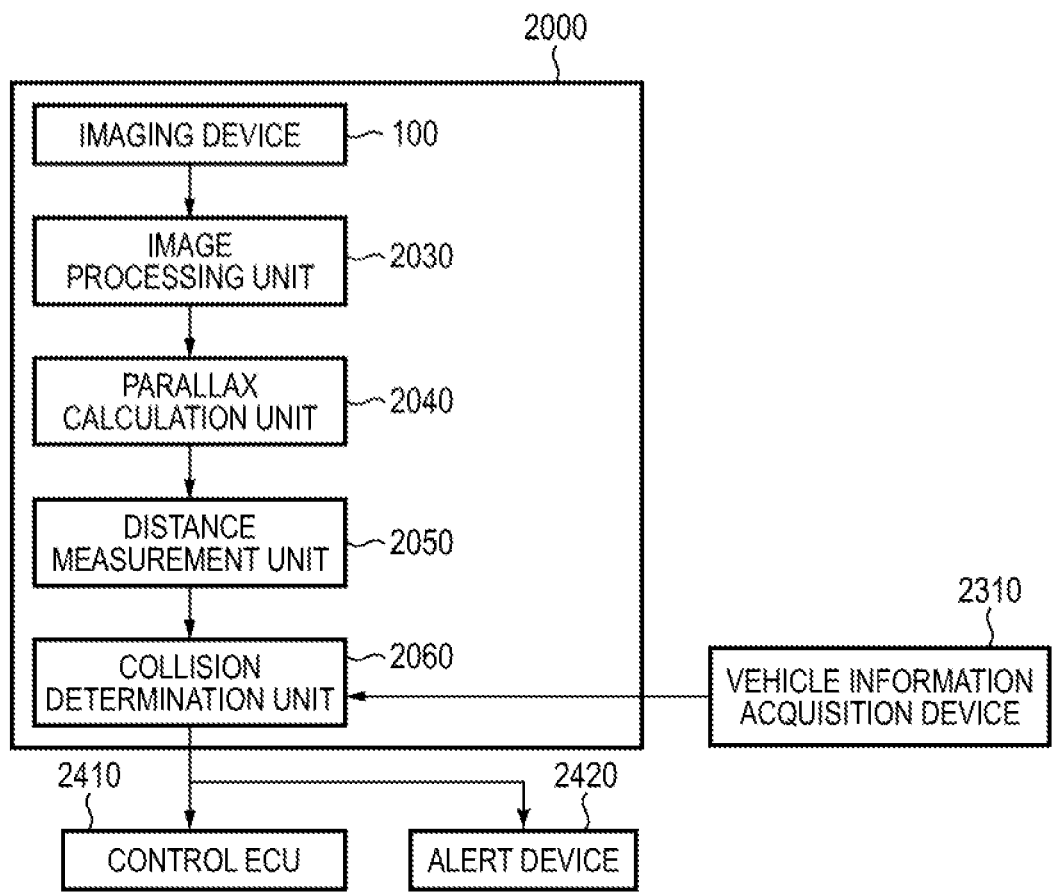
FIG. 21A is a block diagram of an imaging system in an on-vehicle camera in a twelfth embodiment of the present invention.
Figure 21B:
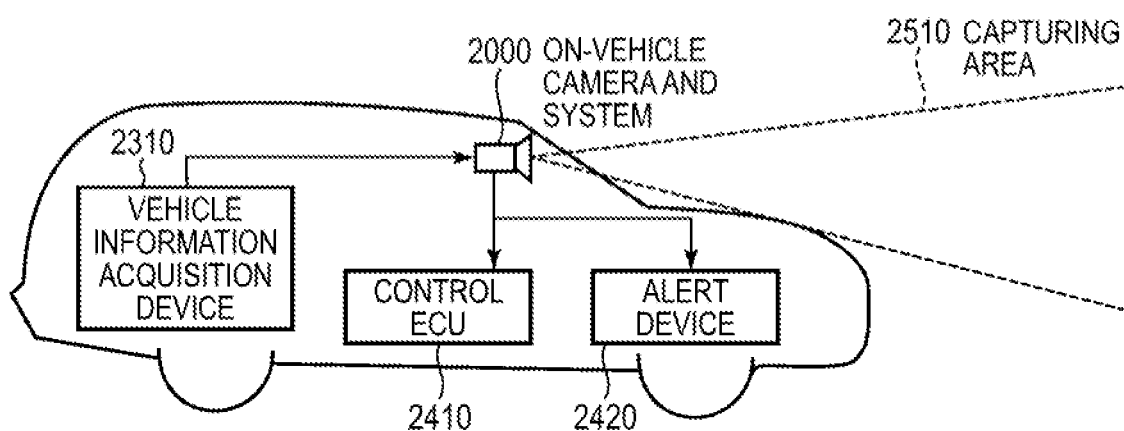
FIG. 21B is a block diagram of the imaging system in the on-vehicle camera in the twelfth embodiment of the present invention.

FIG. 21A and FIG. 21B illustrate an example in which the imaging device in any of the first to eleventh embodiments is applied to an imaging system related to an on-vehicle camera. In the present embodiment, the pixels 10 forming the imaging device 100 may include a first photoelectric conversion unit and a second photoelectric conversion unit. The signal processing unit 104 may be configured to process a signal based on charges generated by the first photoelectric conversion unit and a signal based on charges generated by the second photoelectric conversion unit and acquire distance information on a distance from the imaging device 100 to a subject.

The imaging system 2000 has an image processing unit 2030 that performs image processing on a plurality of image data acquired by the imaging device 100 and a parallax calculation unit 2040 that calculates a parallax (a phase difference of parallax images) from the plurality of image data acquired by the imaging system 2000. Further, the imaging system 2000 has a distance measurement unit 2050 that calculates a distance to the object based on the calculated parallax and a collision determination unit 2060 that determines whether or not there is a collision possibility based on the calculated distance. Here, the parallax calculation unit 2040 and the distance measurement unit 2050 are an example of a distance information acquisition unit that acquires distance information on the distance to the object. That is, the distance information is information on a parallax, a defocus amount, a distance to an object, or the like. The collision determination unit 2060 may use any of the distance information to determine the collision possibility. The distance information acquisition unit may be implemented by dedicatedly designed hardware or may be implemented by a software module. Further, the distance information acquisition unit may be implemented by a Field Programmable Gate Array (FPGA) or an Application Specific Integrated Circuit (ASIC) or may be implemented by combination thereof.

The imaging system 2000 is connected to the vehicle information acquisition device 2310 and can acquire vehicle information such as a vehicle speed, a yaw rate, a steering angle, or the like. Further, the imaging system 2000 is connected to a control ECU 2410, which is a control device that outputs a control signal for causing a vehicle to generate braking force based on a determination result by the collision determination unit 2060. Further, the imaging system 2000 is also connected to an alert device 2420 that issues an alert to the driver based on a determination result by the collision determination unit 2060. For example, when the collision probability is high as the determination result of the collision determination unit 2060, the control ECU 2410 performs vehicle control to avoid a collision or reduce damage by applying a brake, pushing back an accelerator, suppressing engine power, or the like. The alert device 2420 alerts a user by sounding an alert such as a sound, displaying alert information on a display of a car navigation system or the like, providing vibration to a seat belt or a steering wheel, or the like. The imaging system 2000 functions as a control unit that performs control of the operation to control a vehicle as described above.

In the present embodiment, an area around a vehicle, for example, a front area or a rear area is captured by using the imaging system 2000. FIG. 21B illustrates the imaging system when a front area of a vehicle (a capturing area 2510) is captured. The vehicle information acquisition device 2310 as a capture control unit transmits an instruction to the imaging system 2000 or the imaging device 100 so as to perform an operation described in the above first to eleventh embodiments. Since the operation of the imaging device 100 is the same as that in the first to eleventh embodiments, the description thereof will be omitted here. Such a configuration can further improve the ranging accuracy.

Although the example of control for avoiding a collision to another vehicle has been described above, the embodiment is applicable to automatic driving control for following another vehicle, automatic driving control for not going out of a traffic lane, or the like. Furthermore, the imaging system is not limited to a vehicle such as the subject vehicle and can be applied to a moving unit (moving apparatus) such as a ship, an airplane, or an industrial robot, for example. In addition, the imaging system can be widely applied to a device which utilizes object recognition, such as an intelligent transportation system (ITS), without being limited to moving units.

Thirteenth Embodiment

While the signal processing unit 104 and the control unit 110 that perform a motion detection process and a determination process of a mode of readout blocks are provided outside the imaging device in the embodiments described above, the signal processing unit 104 and the control unit 110 may be provided inside the imaging device 100. For example, the signal processing unit 104 and the control unit 110 may be mounted on the semiconductor substrate (third substrate) 1C illustrated in FIG. 12. When the rate is restricted on a signal path from the imaging device 100 to the signal processing unit 104, with the signal processing unit 104 and the control unit 110 being provided inside the imaging device 100, the signal transmission path to the signal processing unit 104 and the control unit 110 can be shortened. Thereby, the signal processing unit 104 can read out a signal at a high rate enabling capturing at a high framerate, and the control unit 110 can accurately detect motion of a subject moving fast.

Fourteenth Embodiment

The signal processing unit 104 and the control unit 110 may be mounted on the semiconductor substrate (second substrate) 1B illustrated in FIG. 13. Also in the present embodiment, when the rate is restricted on a signal path from the imaging device 100 to the signal processing unit 104, with the signal processing unit 104 and the control unit 110 being provided inside the imaging device 100, the signal transmission path to the signal processing unit 104 and the control unit 110 can be shortened. This enables capturing at a high framerate and accurate detection of motion of a subject moving fast.

Other Embodiments

The present invention is not limited to the embodiments described above, and the present invention can be implemented in various forms without departing from the technical concept thereof or the primary features thereof. For example, an example in which a part of the configuration of any of the embodiments is added to another embodiment or an example in which a part of the configuration of any of the embodiments is replaced with a part of the configuration of another embodiment is one of the embodiments of the present invention.

The embodiments of the present invention may be implemented by a computer of an imaging system or an imaging device that reads out and executes a computer executable instruction (for example, one or a plurality of programs) stored in a storage medium. Further, an application specific integrated circuit (ASIC) can be used as a non-transitory computer readable storage medium. The storage medium in which a program code for implementing the function described above is stored may be supplied to the imaging system or the imaging device. Furthermore, the imaging system or the imaging device may download a program so as to execute some or all of the functions described above through a network or a server.

A processor (for example, central processing unit (CPU), a micro processing unit (MPU)) may be included in an imaging system or an imaging device. A computer executable instruction can be provided to a computer from a network or a storage medium, for example. The storage medium may be, for example, a hard disk, a random access memory (RAM), a read-only memory (ROM), storage devices of a distributed computing system, an optical disk (for example, a compact disk (CD), a digital versatile disk (DVD), a Blu-ray disk (BD) (registered trademark)), a flash memory device, a memory card, or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-163852, filed Aug. 31, 2018 and Japanese Patent Application No. 2019-108210, filed Jun. 10, 2019, which are hereby incorporated by reference herein in their entirety.

REFERENCE SIGNS LIST

BL, BL1, BL2 pixel block
2 pixel unit
3 vertical scanning circuit
4 ADC circuit
5 signal processing circuit
6 horizontal scanning circuit
7 control circuit
10 pixel
100 imaging device
110 control unit
PD1, PD2 photoelectric conversion unit
M1 transfer transistor
M2 reset transistor
M3 amplification transistor
M4 select transistor
FD floating diffusion region
M5, M6, M10, M50, M60 switch
L1 column signal line

The invention claimed is:
1. An imaging device comprising:
a pixel unit having a plurality of pixels arranged to form a plurality of rows and a plurality of columns;
a readout unit that divides the pixel unit into a plurality of pixel blocks in accordance with a division pattern, each pixel block including at least two of the plurality of pixels, and combines signals from the at least two of the plurality of pixels included in one pixel block of the plurality of pixel blocks to generate one signal for each of the plurality of pixel blocks;
a detection unit that detects a change in signal values between a plurality of signals that are sequentially generated by the readout unit of the one pixel block; and
a control unit that, in response to the detection unit detecting a change in the signal values, controls the readout unit so as to output a signal individually from each of the plurality of pixels included in at least the one pixel block,
wherein the control unit controls the readout unit so that the division patterns are different between at least two frames.

2. The imaging device according to claim 1,
wherein the plurality of pixel blocks in the division pattern have a first pixel block and a second pixel block each including a predetermined number of pixels, and
wherein the control unit changes the number of pixels included in the first pixel block or the second pixel block.

3. The imaging device according to claim 2,
wherein the number of pixels included in the first pixel block is less than the number of pixels included in the second pixel block, and
wherein the control unit changes the number or arrangement of each of the first pixel bock and the second pixel block on a frame basis.

4. The imaging device according to claim 3, wherein the first pixel block and the second pixel block are adjacent to each other.

5. The imaging device according to claim 3, wherein the second pixel block is arranged closer to the periphery in the pixel unit than first pixel block.

6. The imaging device according to claim 3, wherein the second pixel block is arranged closer to the center in the pixel unit than the first pixel block.

7. The imaging device according to claim 3, wherein the first pixel block is arranged between a plurality of second pixel blocks.

8. The imaging device according to claim 2, wherein when the change in the signal values is not detected for a predetermined period, the control unit reduces the number of pixels included in each of the pixel blocks.

9. The imaging device according to claim 3, wherein when the change in the signal values is not detected for a predetermined period, the control unit changes the number or arrangement of each of the first pixel bock and the second pixel block on a frame basis.

10. The imaging device according to claim 1, wherein when the change in the signal values is detected, the readout unit reads out signals on a pixel basis.

11. The imaging device according to claim 1, wherein the readout unit is configured to:
sequentially perform a first mode of reading out the signal from each of the plurality of pixel blocks divided in a first division pattern and a second mode of reading out the signal from each of the plurality of pixel blocks divided in a second division pattern different from the first division pattern, and
in the first mode and the second mode, when the change in the signal values is detected, perform a third mode of reading out signals on a pixel basis.

12. The imaging device according to claim 11,
wherein when the change in the signal values is detected in the first mode, the first mode transitions to the third mode and then transitions to the first mode, and
wherein when the change in the signal values is detected in the second mode, the second mode transitions to the third mode and then transitions to the second mode.

13. The imaging device according to claim 11, wherein after transition to the third mode, the third mode transitions to a mode in which a frequency that changes in the signal values are detected is the highest out of the first mode and the second mode.

14. The imaging device according to claim 11,
wherein when the change in the signal values is not detected for a predetermined period in the first mode, the first mode transitions to the second mode,
wherein when the change in the signal values is not detected for a predetermined period in the second mode, the second mode transitions to the third mode, and
wherein the predetermined period of one mode of the first mode and the second mode in which a frequency that changes in the signal values are detected is the highest is longer than the predetermined period of the other mode.

15. The imaging device according to claim 1, wherein each of the signals of one of the pixel blocks is an addition value of signals of the plurality of pixels included in the one of the pixel blocks.

16. The imaging device according to claim 1, wherein each of the signals of one of the pixel blocks is an average value of signals of the plurality of pixels included in the one of the pixel blocks.

17. The imaging device according to claim 1, wherein each of the signals of one of the pixel blocks is the largest value of signals of the plurality of pixels included in the one of the pixel blocks.

18. The imaging device according to claim 1,
wherein each of the pixels comprises a photoelectric conversion unit that accumulates charges based on an incident light, a transfer transistor that transfers the charges to a floating diffusion region, an amplification transistor that outputs a signal based on the charges in the floating diffusion region to a column signal line, and a reset transistor that resets the floating diffusion region,
wherein the pixel unit comprises a first switch that causes floating diffusion regions on a plurality of rows to be electrically connected to or electrically disconnected from each other, and
wherein the readout unit bins signals of the plurality of pixels on a plurality of rows in the pixel blocks by turning on the first switch.

19. The imaging device according to claim 18,
wherein the pixel unit comprises a second switch that causes column signal lines on a plurality of columns to be electrically connected to or electrically disconnected from each other, and
wherein the readout unit bins signals of the plurality of pixels on a plurality of columns in the pixel blocks by causing the second switch to be turned on.

20. The imaging device according to claim 18,
wherein the pixel unit comprises a third switch that causes floating diffusion regions on a plurality of columns to be electrically connected to or electrically disconnected from each other, and
wherein the readout unit bins signals of the plurality of pixels on a plurality of columns in the pixel blocks by turning on the third switch.

21. The imaging device according to claim 20,
wherein the pixel unit comprises a fourth switch that causes the first switch and the third switch to be electrically connected to or electrically disconnected from the floating diffusion region, and
wherein when reading out signals on a pixel basis, the readout unit turns off the third switch.

22. The imaging device according to claim 20,
wherein each of the pixels comprises a plurality of photoelectric conversion units on which color filters of different colors from each other are provided, and
wherein when reading out signals on a pixel basis, the readout unit reads out signals of the photoelectric conversion units on which the color filters having the same color are provided on each row.

23. The imaging device according to claim 1,
wherein the plurality of pixels comprise color filters having a plurality of colors, and
wherein the readout unit bins signals of the plurality of pixels which comprise the color filter of the same color out of the plurality of pixels included in one of the pixel blocks.

24. The imaging device according claim 1,
wherein the plurality of pixels comprise color filters having a plurality of colors, and
wherein the readout unit bins signals of the plurality of pixels which comprise the color filter of different colors out of the plurality of pixels included in one of the pixel blocks.

25. The imaging device according to claim 1 comprising:
a first substrate in which the pixel unit is formed; and
a second substrate which is stacked on the first substrate and ire which the readout unit is formed.

26. The imaging device according to claim 25 further comprising a third substrate which is stacked on the first substrate and the second substrate and in which a memory unit that holds the signals read out by the readout unit is formed.

27. The imaging device according to claim 1, wherein the control unit sets the number of pixels included in the pixel block or arrangement of the pixel blocks based on a learning model that has learned in advance a relationship between signals from the plurality of pixels or signals from the pixel block and the number of pixels included in the pixel block or arrangement of the pixel blocks.

28. The imaging device according to claim 27, wherein in a neural network to which signals from the plurality of pixels or signals from the pixel blocks are input and which outputs the number of pixels included in the pixel block or arrangement of the pixel blocks, the control unit learns the learning model by updating weighting between nodes of the neural network.

29. An imaging system comprising:
the imaging device according to claim 1; and
a signal processing unit that processes signals output from the imaging device.

30. The imaging system according to claim 29,
wherein the pixels comprise a plurality of photoelectric conversion units, and
wherein the signal processing unit processes the signals generated by the plurality of photoelectric conversion units, respectively, and acquires distance information on a distance from the imaging device to a subject.

31. An imaging device comprising:
a pixel unit having a plurality of pixels arranged to form a plurality of rows and a plurality of columns;
a readout unit that divides the pixel unit into a plurality of pixel blocks in accordance with a division pattern, each pixel block including at least two of the plurality of pixels, and combines signals from the at least two of the plurality of pixels included in one pixel block of the plurality of pixel blocks to generate one signal for each of the plurality of pixel blocks;
a detection unit that detects a change in signal values between a plurality of signals that are sequentially generated by the readout unit of the one pixel block; and
a control unit that, in response to the detection unit detecting a change in the signal values, controls the readout unit so as to output a signal individually from each of the plurality of pixels included in at least the one pixel block,
wherein the control unit controls the readout unit so that, in a frame in which the division pattern includes a first pixel block and a second pixel block, the number of pixels included in the first pixel block and the number of pixels included in the second pixel block are different from each other.

32. An imaging device comprising:
a pixel unit having a plurality of pixels arranged to form a plurality of rows and a plurality of columns;
a readout that divides the pixel unit into a plurality of pixel blocks in accordance with a division pattern, each pixel block including at least two of the plurality of pixels, and combines signals from the at least two of the plurality of pixels included in one pixel block of the plurality of pixel blocks to generate one signal for each of the plurality of pixel blocks;
a detection unit that detects a change in signal values between a plurality of signals that are sequentially generated by the readout unit of the one pixel block; and
a control unit that, in response to the detection unit detecting a change in the signal values, controls the readout unit so as to output a signal individually from each of the plurality of pixels included in at least the one pixel block,
wherein when the detection unit detects no change in signal values for a predetermined number of frames, the control unit controls the readout unit so as to output signals individually from the plurality of pixels included in at least the one pixel block.

* * * * *